(12) United States Patent
Tourangeau et al.

(10) Patent No.: US 12,365,031 B2
(45) Date of Patent: Jul. 22, 2025

(54) VOLUMETRIC KERNEL REPRESENTATION OF THREE DIMENSIONAL MODELS

(71) Applicant: Autodesk, Inc., San Francisco, CA (US)

(72) Inventors: Vincent Stanley Tourangeau, Toronto (CA); Sriram Dayanand, Toronto (CA); Panagiotis Michalatos, Cambridge, MA (US); Gregory William Fowler, Toronto (CA); Ramesh Santhanam, MississaugA (CA)

(73) Assignee: Autodesk, Inc., San Francisco, CA (US)

( * ) Notice: Subject to any disclaimer, the term of this patent is extended or adjusted under 35 U.S.C. 154(b) by 465 days.

(21) Appl. No.: 17/742,309

(22) Filed: May 11, 2022

(65) Prior Publication Data

US 2022/0402038 A1 Dec. 22, 2022

Related U.S. Application Data

(63) Continuation of application No. PCT/US2020/061083, filed on Nov. 18, 2020.
(Continued)

(51) Int. Cl.
*B22F 10/80* (2021.01)
*B33Y 50/00* (2015.01)
(Continued)

(52) U.S. Cl.
CPC .............. *B22F 10/80* (2021.01); *B33Y 50/00* (2014.12); *G05B 19/4099* (2013.01); *G06T 17/00* (2013.01); *G06T 2200/24* (2013.01)

(58) Field of Classification Search
CPC ..... B22F 10/80; B33Y 50/00; G05B 19/4099; G06T 17/00; G06T 2200/24
(Continued)

(56) References Cited

U.S. PATENT DOCUMENTS 10,065,373 B2 9/2018 Iorio et al.
2012/0053716 A1 3/2012 Bickel et al.
(Continued)

FOREIGN PATENT DOCUMENTS

WO WO 2017/203528 11/2017

OTHER PUBLICATIONS

International Search Report and Written Opinion in International Appln. No. PCT/US2020/061083, dated Feb. 9, 2021, 12 pages.
(Continued)

*Primary Examiner* — Hai Tao Sun
(74) *Attorney, Agent, or Firm* — Fish & Richardson P.C.

(57) ABSTRACT

Methods, systems, and apparatus, including medium-encoded computer program products, for volumetric kernel representation of three dimensional models include: modeling a three dimensional object using a volumetric representation including fields that determine volumetric properties, each of the fields being parameterized by an input and output tensor structure, and at least one of the fields mapping tensor output of a first of the fields to tensor input of a second of the fields to provide a unified framework for geometry manipulation and composition that encompasses both discrete and continuous representations of materials in the three dimensional space; evaluating the fields including using coverage values that determine compositing behavior to generate output data corresponding to the volumetric properties; and providing the output data for the three dimensional object having physical characteristics that vary from
(Continued)

point to point within a volume of the three dimensional object in accordance with the volumetric properties.

37 Claims, 14 Drawing Sheets

Related U.S. Application Data

(60) Provisional application No. 62/937,156, filed on Nov. 18, 2019.

(51) Int. Cl.
  *G05B 19/4099* (2006.01)
  *G06T 17/00* (2006.01)
(58) Field of Classification Search
  USPC .......................................................... 345/419
  See application file for complete search history.

(56) References Cited

U.S. PATENT DOCUMENTS

| 2014/0071125 | A1 | 3/2014 | Burlina et al. |
| 2015/0021830 | A1 | 1/2015 | Yerazunis et al. |
| 2016/0101570 | A1* | 4/2016 | Iorio ................... B29C 64/393 700/98 |
| 2019/0130642 | A1* | 5/2019 | Elber ..................... G06T 17/10 |

OTHER PUBLICATIONS

KDnuggets.com [online], "WTF is a Tensor ?!? " May 2018, retrieved on Oct. 26, 2020, retrieved from URL <https://www.kdnuggets.com/2018/05/wtf-tensor.html>, 6 pages.

Michalatos et al., "Monolith: The Biomedical Paradigm and the Inner Complexity of Hierarchical Material Design," Complexity & Simplicity—Proceedings of the 34th eCAADe Conference—vol. 1, University of Oulu, Oulu, Finland, Aug. 22-26, 2016, pp. 445-454.

* cited by examiner

VOLUMETRIC KERNEL REPRESENTATION OF THREE DIMENSIONAL MODELS

CROSS-REFERENCE TO RELATED APPLICATIONS

This application is a continuation application of, and claims the benefit of priority of, PCT/US2020/061083, filed 18 Nov. 2020, published as PCT Publication No. WO 2021/102018 A1 on 27 May 2021, and titled "VOLUMETRIC KERNEL REPRESENTATION OF THREE DIMENSIONAL MODELS", which claims the benefit of priority of U.S. Patent Application No. 62/937,156, entitled "VOLUMETRIC KERNEL REPRESENTATION OF THREE DIMENSIONAL MODELS", filed 18 Nov. 2019.

BACKGROUND

This specification relates to three dimensional (3D) modeling in computer graphics applications, such as computer generated animation and computer aided design of physical structures to be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to manufacture the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as simply a B-Rep), geometry is stored in the computer using smooth and precise mathematical surfaces, in contrast to the discrete and approximate surfaces of mesh model geometry, which can be difficult to work with in a CAD program. Other types of smooth surface models used in CAD programs include Non-Uniform Rational Basis Splines (NURBS), T-Splines, and Subdivision (SubDiv) Surfaces. In addition, volumetric representations have included voxel structures for the purpose of describing inherently volumetric objects, such as human body parts as scanned by Magnetic Resonance Imaging (MRI) and Computerized Axial Tomography (CAT) machines, and U.S. Pat. No. 10,065,373, which is hereby incorporated by reference, describes technologies relating to the creation and use of multi-material 3D models.

CAD software has been used in conjunction with subtractive manufacturing systems and techniques, such as CNC machine cutting, electrode discharge machining, chemical machining, and waterjet machining. CAD software has also been used in conjunction with additive manufacturing systems and techniques, also known as solid free form fabrication or 3D printing, such as Fused Filament Fabrication (FFF) and Selective Laser Sintering (SLS). In addition, CAD software has been designed so as to perform automatic generation of 3D geometry (generative design) for a part or one or more parts in a larger system of parts to be manufactured.

SUMMARY

Volumetric Kernel Representation (VKR) is a product agnostic technology that provides a unified approach to representing, creating and manipulating volumetric data in three dimensions. While traditional CAD modeling systems have been very proficient in representing the boundaries of 3D objects that are assumed to have isotropic solid material interiors, recent advances in manufacturing, e.g., additive manufacturing, have opened up possibilities for controlling the interior volume of objects. VKR provides powerful ways to represent volumetric properties like porosity, material mixing, color, etc., to take advantage of such advances in manufacturing. In addition, VKR provides ways in which the volumetric information is able to co-exist and leverage simulation results and drive them too. VKR also aims to innovate in the area of user interactions for the creation and manipulation of the volumetric information and also in the field of visualization of the implicitly represented volumetric information using volumetric rendering techniques. With the combination of the efficient representation of the information and the innovations in user interactions and visualizations, VKR will provide volumetric capabilities that can be integrated into software products that represent three dimensional space in unique and powerful ways.

In general, one or more aspects of the subject matter described in this specification can be embodied in one or more methods that include: modeling a three dimensional object using a volumetric representation of volumetric properties including material mixing and porosity within a three dimensional space of the three dimensional object, the volumetric representation including fields that determine the volumetric properties, each of the fields is parameterized by an input and output tensor structure, and at least one of the fields maps tensor output of a first of the fields to tensor input of a second of the fields to provide a unified framework for geometry manipulation and composition that encompasses both discrete and continuous representations of materials in the three dimensional space of the three dimensional object; evaluating the fields of the volumetric representation, including evaluating the at least one of the fields using coverage values that determine compositing behavior when mapping the tensor output of the first of the fields to the tensor input of the second of the fields, to generate output data corresponding to the volumetric properties; and providing the output data for the three dimensional object, wherein the three dimensional object has physical characteristics that vary from point to point within a volume of the three dimensional object in accordance with the volumetric properties.

The fields of the volumetric representation need not have an intrinsic resolution, the evaluating can include generating the output data sparsely, and the providing can include visualizing the output data on a display device. Also, the fields of the volumetric representation need not have an intrinsic resolution, the evaluating can include generating the output data at a resolution specified for three dimensional printing, and the providing can include sending the output data to a machine to perform the three dimensional printing.

The modeling can include using the volumetric representation including one or more fields of primitive building block field types including signed distance fields around geometric entities, dense grid-based fields, and fields that extend local coordinate systems to produce conformal lattices. The modeling can include using the volumetric representation including one or more composite fields that reference other fields, creating an associative hierarchy of tensor to tensor maps.

The modeling can include using the volumetric representation including one or more composite fields that reference other fields, creating an associative hierarchy of tensor to tensor maps, and the associative hierarchy of tensor to tensor maps can include a definition of a microstructure that is modulated, via the associative hierarchy, through the three dimensional space of the three dimensional object to produce at least a portion of the physical characteristics that vary from point to point within the volume of the three dimensional object. Further, modulation of the microstructure through the three dimensional space of the three dimensional object can produce a lattice for the three dimensional object.

The modeling can include using the volumetric representation including one or more masking fields that operate on other coverage values of one or more other fields to affect compositing behavior of the other coverage values. Any operation between two of the fields of the volumetric representation can generate a new field that absorbs the two fields so all relations are maintained and are editable at any point therein. The fields of the volumetric representation can be contained in channels including a boundary channel that specifies an absolute boundary of one or more defined properties, a meso-structure channel that produces the porosity within the three dimensional space, and a material mixing channel that produces the material mixing within the three dimensional space.

The method(s) can include: presenting on a display device a user interface showing functional composition graphs indicating evaluation and composition of the fields in the channels of the volumetric representation of the three dimensional object as specified by at least the at least one of the fields; receiving user input through the functional composition graphs of the user interface; and modifying the evaluation and composition of the fields in the channels of the volumetric representation of the three dimensional object in accordance with the user input. The method(s) can include: using the evaluation and composition of the fields to evaluate a cell of the three dimensional object at different density levels in accordance with composition using the meso-structure channel and the material mixing channel, thereby generating a homogenized representative volume element; initiating finite element numerical simulation of the three dimensional object using the homogenized representative volume element and output generated with the boundary channel; and modifying the evaluation and composition of the fields, one or more fields in the meso-structure channel or the material mixing channel or both, or both the evaluation and composition of the fields and the one or more fields responsive to results of the finite element numerical simulation of the three dimensional object. In addition, the modifying responsive to the results of the finite element numerical simulation can include producing a conformal lattice within the three dimensional object that follows principal stress directions indicated by the results of the finite element numerical simulation.

One or more aspects of the subject matter described in this specification can be embodied in a non-transitory computer-readable medium encoding instructions operable to cause data processing apparatus to perform operations that store a representation of a three dimensional (3D) model, and enable user manipulation of the 3D model, using any of the one or more method described. Further, one or more aspects of the subject matter described in this specification can be embodied in a system including: a non-transitory storage medium having instructions of a computer aided design program stored thereon; and one or more data processing apparatus able to run the instructions of the computer aided design program to perform operations that store a representation of a three dimensional (3D) model, and enable user manipulation of the 3D model, using any of the one or more method described. Moreover, the system can include one or more computer-controlled manufacturing systems including an additive manufacturing machine or a subtractive manufacturing machine, wherein the one or more data processing apparatus are able to run the instructions of the computer aided design program to generate toolpath specifications for the additive manufacturing machine or the subtractive manufacturing machine from at least a portion of the 3D model, and to manufacture at least a portion of a physical structure corresponding to the at least a portion of the 3D model with the additive manufacturing machine or the subtractive manufacturing machine using the toolpath specifications generated for the additive manufacturing machine or the subtractive manufacturing machine.

The details of one or more embodiments of the subject matter described in this specification are set forth in the accompanying drawings and the description below. Other features, aspects, and advantages of the invention will become apparent from the description, the drawings, and the claims.

DETAILED DESCRIPTION

Advances in digital manufacturing create new demands on design and simulation software, while advances in hardware enable new workflows and design paradigms to be implemented. One such case is related to the ability of additive manufacturing to create functionally graded materials. That is, to make objects whose physical characteristics (color, porosity, strength, thermal conductivity, etc.) vary from point to point within their volume. This can be achieved either by selective mixing of materials, or the modulation of some microstructure (e.g., the halftoning patterns used to create "digital" material in STRATASYS' polyjet technology or the lattices used in lightweight metal printing applications).

Figure 1A:
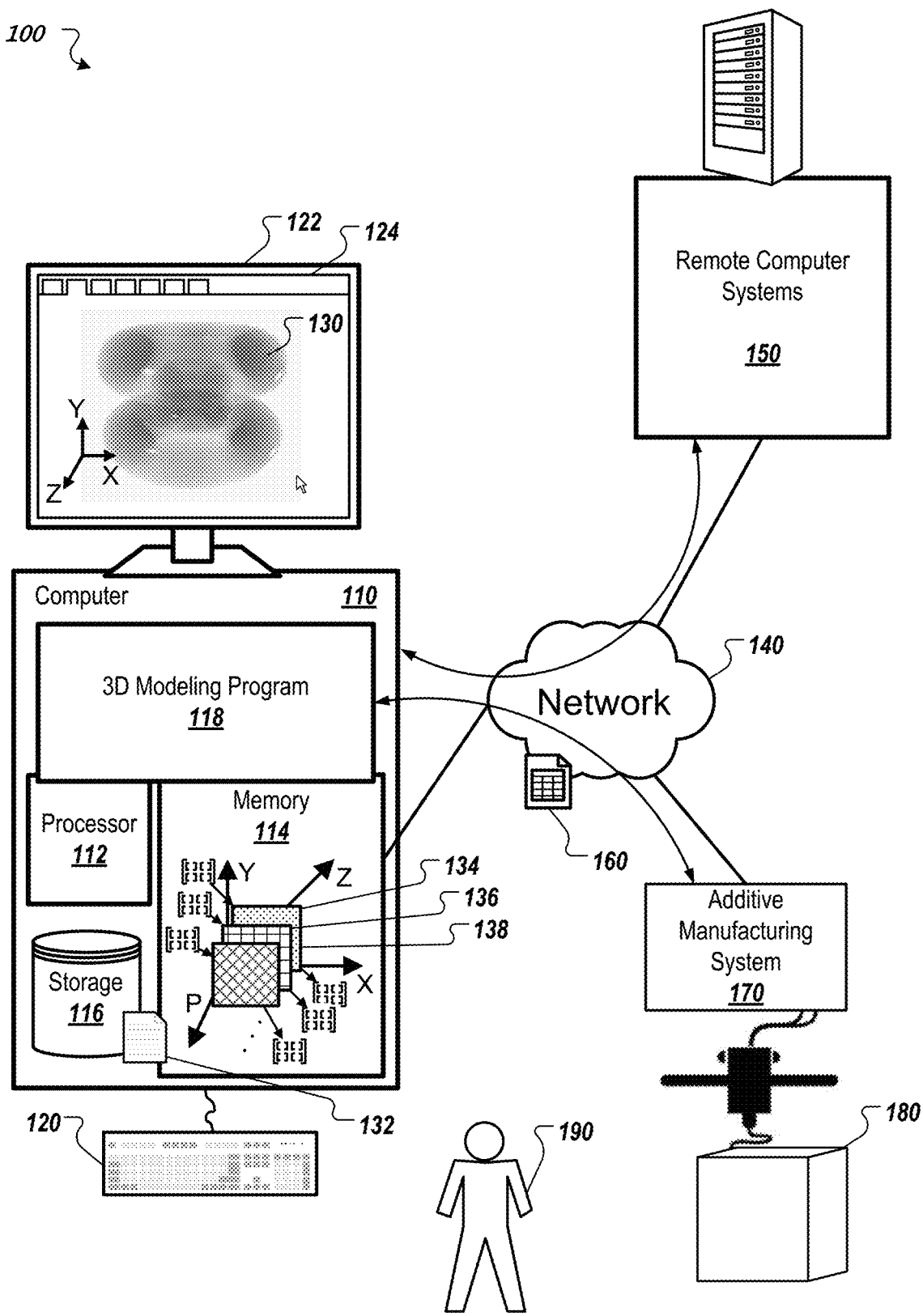
FIGS. 1A-1G show an example of a system that provides a three dimensional (3D) modeling framework for volumetric modeling, e.g., of multi-material 3D models.

FIG. 1A shows an example of a system 100 that provides a three dimensional (3D) modeling framework for volumetric modeling, e.g., of multi-material 3D models, including an example of a 3D model 130 with such variable physical characteristics. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include volatile and/or non-volatile memory, such as Random Access Memory (RAM) and Flash RAM. The computer 110 can include various types of computer storage media and devices, which can include the memory 114 and a persistent storage device 116 (e.g., a hard disk drive), to store instructions of programs that run on the processor 112 as well as data therefor.

Such programs can include a 3D modeling program 118, which can run locally on computer 110 or remotely on a computer of one or more remote computer systems 150 (e.g., in a server system accessible by the computer 110 via the network 140). The 3D modeling program 118 presents a user interface (UI) 124 on a display device 122 of the computer 110, which can be operated using one or more input devices 120 of the computer 110 (e.g., keyboard and mouse). Note that while shown as separate devices in FIG. 1A, the display device 122 and/or input devices 120 can also be integrated with each other and/or with the computer 110, such as in a tablet computer.

A user 190 can interact with the 3D modeling program 118 to create the 3D model 130 of an object 180 to be created using an additive manufacturing (AM) system 170 (e.g., 3D printed using a multi-material 3D printer). The AM system 170 can be connected to the computer 110 through the network 140 (as shown) or directly connected to the computer 110. The creation of the 3D model 130 can be done using known graphical user interface tools and/or using the additional graphical user interface tools described in this document, and the display device 122 can present a view of the 3D object being modeled in three dimensions (X, Y, and Z) as a projection into the two dimensional space of the display device 122 (as shown). In addition, the UI 124 of the program 118 can allow the user 190 to provide input specifying different properties of the object. The AM system 170 can manufacture the object 180 to have the different specified properties, such as by employing different additive manufacturing process specifics (e.g., modifying laser intensity in a laser sintering system) in accordance with the specified different properties, employing different combinations of different input materials (e.g., modifying which metals are used, and/or the amounts thereof, to form alloys) in accordance with the specified different properties, or both, to match the desired properties for the object 180. Although the object 180 is shown here as a simple box, it will be appreciated that many different and complicated physical objects can be modelled and tested in the computer 110 using numerical simulation, and then additively manufactured (3D printed) using various additive manufacturing systems and techniques, potentially in combination with various subtractive manufacturing systems and techniques.

With current CAD and modeling software, one can typically only define properties on the boundary of objects as most software is based on boundary representations (B-Rep) or mesh surfaces. In the biomedical industry the representation and visualization of continuously varying volumetric material fields has been around for decades, but the emphasis there was more on the analysis and communication of visual information rather than design and modeling. In addition, there is a multitude of ways to represent volumetric data (dense/sparse voxels, unstructured grids, freps, analytical, trivariate NURBS and others) that have been developed for different purposes and in different fields.

The present disclosure provides a unified approach to representation and manipulation of all volumetric data, which is compatible with existing B-Rep modeling environments, simulation methods and manufacturing workflows, and facilitates interoperability and better integration between these usually distinct design stages. In addition, user facing aspects of the volumetric modeling are developed with a functional prototype of volumetric and hierarchical modeling workflows within an associative geometric modeling environment, and interaction patterns and visualization methods are developed that aid in the seamless integration of volumetric techniques within existing CAD. VKR includes two parts, the core which deals with low level algorithms and data structures, and the VKR addin (to a geometric modeling environment) which deals with visualization and interactivity.

Core Features—Fields

The central concept in the core is a field parameterized by its input and output tensor structure. E.g., a 2D image is a field that maps from R2 (pixel space) to R4 (color space). A 3D volumetric solid can be seen as a map from R3 to R3 and so on. This idea of tensor to tensor maps provides a unified framework for geometry manipulation and composition that encompasses both discrete (voxels, images, unstructured grids) and continuous representation. It also unifies ideas from solid modeling (Constructive Solid Geometry (CSG), etc.) with ideas from image analysis and manipulation (compositing filtering and so on). Unlike voxel-based approaches, a field does not have an intrinsic resolution but is evaluated according to context (maybe sparsely for interactive visualization, or at very high resolution for 3d printing).

Thus, when different properties are specified for the 3D model 130 of the object 180, the program 118 can generate separate but overlapping representations 134, 136, 138 of the model 130 for the respective properties/characteristics of the object, where the representations 134, 136, 138 are fields parameterized by an input and output tensor structure, and these fields 134, 136, 138 together form the volumetric representation. The separate representations are shown as a projection of a four dimensional object into the two dimensions of the page for ease of explanation, i.e., each respective property of the object model 130 can be thought of as a slice of the object at a particular point along a property (P) dimension of the object. Each such slice 134, 136, 138 is used to save data for the object model 130 within a domain of a three dimensional (X, Y, Z) volume, and the representations can overlap in the sense that each representation 134, 136, 138 can define its respective property of the object within that same domain of 3D space. In other words, two or more of the representations 134, 136, 138 can have overlapping 3D coordinate systems.

The inputs and outputs of fields 134, 136, 138 are samples which are pairs of a tensor (scalar value, vector or any tensor up to rank 4) and a coverage value that determines compositing behavior and is a more general version of the alpha value used in image compositing. The generalized tensor output allows the 3D modeling program 118 to handle any data layout like scalar level set fields (that describe solid objects), color fields, stress and strain fields coming from simulation. The generalization of the input tensor unifies volumetric data with 2D graphics and parametric geometries. Thus, compositing with a tensor structure of input and output, as described, applies not just to 3D, but also to 2D and/or 1D spaces.

The only thing that defines a field is its evaluator method regardless of its underlying representation. Therefore, it becomes trivial to composite a voxel-based field with an analytical field and a geometry driven one.

There are a few primitive building block field types:
a. Signed distance fields around geometric entities (points, curves, surfaces and bodies) help to create links between volumetric data and conventional CAD representations.
b. Dense grid-based fields are conventional voxel structures that represent digitized information or data coming from simulation.
c. Function based fields allow easy extensibility by capturing a lambda or even a user provided text formula that is parsed.
d. Fields that extend in some way local coordinate systems intrinsic to parametric curves and surfaces to the whole space along the distance field. We use such fields to produce conformal lattices that the user can control through curves that determine the "flow" of the generated grid.

There are also a lot of composite fields that reference these basic field types or other composite fields in a sense creating an associative hierarchy of maps. Such fields include:
a. Various binary operators that correspond to CSG or define a compositing algebra (addition, multiplication, blending, etc.). For example, max compositing can be used between the lattice and the boundary of a solid to guarantee a clear cutoff. Min compositing can be used between the boundary's signed distance field and the lattice porosity field to make the lattice become more solid near the boundary. Compositing operators can express Boolean, blending and mixing geometric operations in a seamless unified approach.
b. Composition fields correspond to functional composition between fields $f(g(x))$ and generalize the concept of texture mapping. Such composition(s) can be used to create highly irregular lattices that the user can control.
c. The latticing field is a special case of a composition between a warping field (UVW coordinates generator) and a cell field that corresponds to some procedural or repeating pattern modulated by a density scalar field.
d. Masking fields operate on the coverage rather than the values of the fields affecting their compositing behavior. For example, you can have one type of lattice or material in a region of space transition to another one according to some masking field that affects the coverage of one of the lattices. The masking and coverage approach will also help determine what happens when a user does a Boolean operation between two solids that contain different volumetric material properties or microstructures. In other software that deals with similar issues (e.g., the fill color of two circles joined in ILLUSTRATOR software) the properties of one object overtake the results. Masking can be used to maintain the distinct properties in the regions of space that the two solids occupied before any desired Boolean operation.

As noted above, the AM system 170 can manufacture the object 180 to have the different specified properties. In some implementations, this involves employing different additive manufacturing process specifics (e.g., modifying laser intensity in a laser sintering system) in accordance with the specified different properties when manufacturing the object 180. In some implementations, this involves employing different combinations of different input materials (e.g., modifying which metals are used, and/or the amounts thereof, to form alloys) in accordance with the specified different properties. In some implementations, the AM system 170 can manufacture the object 180 to match the desire properties therefor using both different additive manufacturing process specifics and different combinations of different input materials. Further, at least one of the different representations 134, 136, 138 can be used to specify different combinations of different input materials (e.g., mixing of different materials during a material layering process to generate a new material), and at least one of the different representations 134, 136, 138 can be used to specify different additive manufacturing process specifics (e.g., pointwise process control of temperature, pressure, etc.) to provide localized control of the manufacturing process performed by the AM system 170 (e.g., by varying the control coefficients fed to the AM system 170 to get the desired material properties in the 3D domain of the object 180).

In any case, the different representations 134, 136, 138 of an object can be populated, saved and manipulated in memory 114, and these different representations can also be stored as a document 132 for later reloading, reediting (as needed) and manufacture (e.g., 3D printing). In addition, the document 132 can be sent over the network 140, such as to an online marketplace server system 150 for 3D models made available for sale and 3D printing. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

Core Features—VREP

Figure 1B:
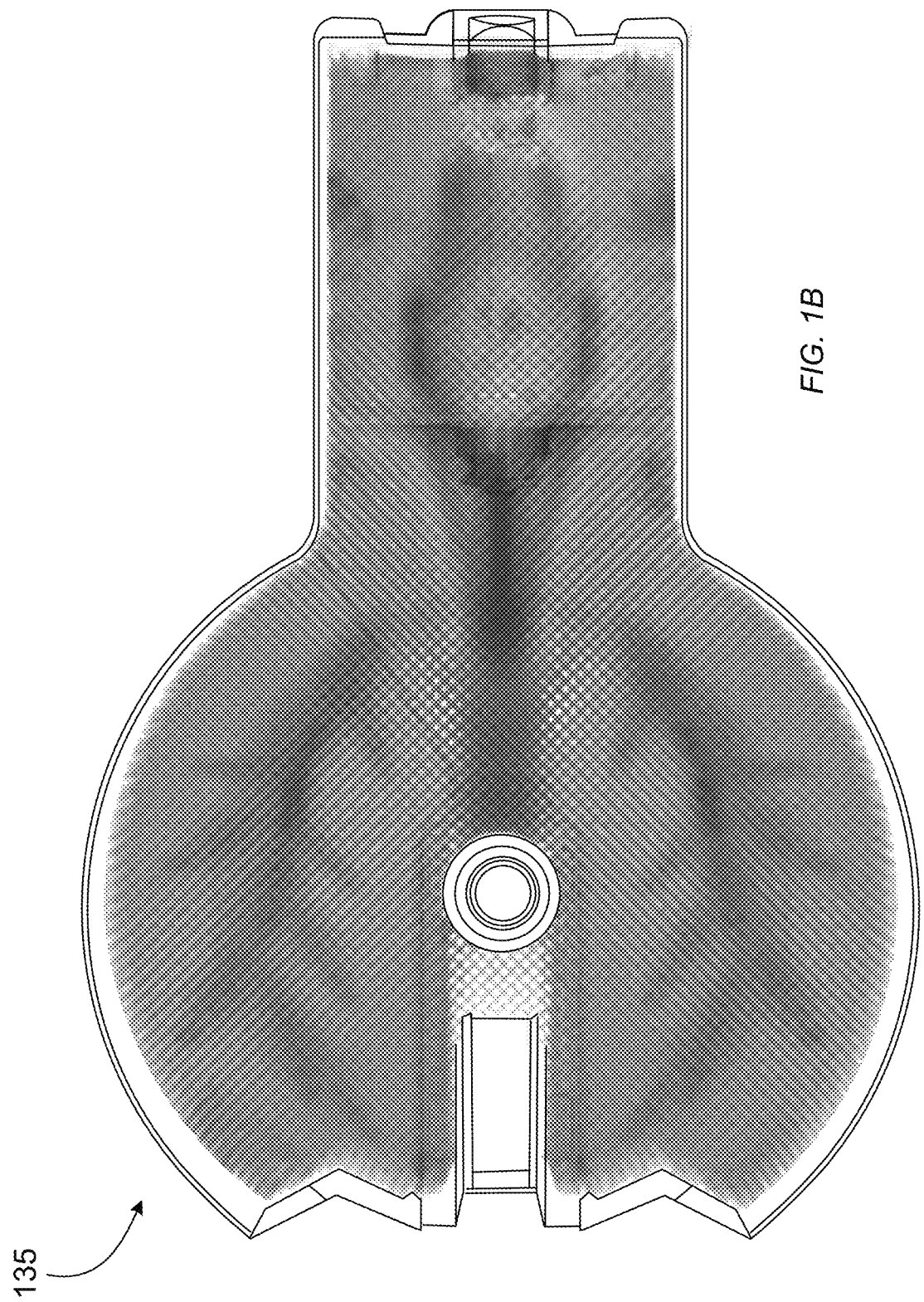

One problem with volumetric modeling approaches is that usually they don't work well alongside analytical B-Reps which dominate the CAD world. In addition, a field by itself has no information about the use and intended interpretation of its numerical values. Within VKR fields exist a structure called the VREP (for volumetric representation). FIG. 1B shows an example of a VREP 135. A VREP includes one or more channels that determine the source, purpose or meaning of the fields they contain. A VREP can have any number of channels with user defined tags depending on application and use case. However, there are some channel types that can have a fixed meaning and translate to specific things within modeling application, visualization, simulation and manufacturing processes. Each VREP can contain a boundary channel, e.g., that generates a scalar field representing the signed distance field levelset of a solid object and is interpreted as the absolute boundary of any other defined properties. This field can be generated by a B-Rep body or a mesh or other suitable 3D model representation.

Other channels contain color information, material mixing (for multi material printers) or indexed materials. The latticing or "meso-structure" channel contains a field that eventually gets min composited with the boundary to produce erosion, lattice or porosity structure(s) within the volume.

The extensibility of the VREP structure can facilitate better interoperability and integration between processes. For example, the user can define a VREP out of a solid body and some latticing and then pass this to a mechanical simulation. The simulation module can write the results in the same VREP (e.g., as a discrete tensor field for the stress and tag it as the stress channel). On the modeling side the user can pick a simulation generated field and use it to drive the density or material distribution or locally alter some feature of the body.

Furthermore, returning to FIG. 1A, the program 118 can extract data from a VREP including fields 134, 136, 138, which can provide output values of the 3D model 130 at a specified resolution. This can be used both in generating visual preview data of the 3D model 130 in the UI 124 and also in generating an output document 160, which the AM system 170 can use to build the object 180. For example, the 3D modeling program 118 can store information regarding the capabilities of the AM system 170 (or retrieve this information from the AM system 170) and use this capabilities information (potentially in combination with input from the user 190) to obtain data samples from the different representations 134, 136, 138 at an appropriate resolution and combine those data samples into an output format usable by the AM system 170 to print the object 180 by combining different materials to create structures with the desired properties.

User Facing Features

The VKR structures are used to provide user facing workflows and reduce the complexity of defining and handling volumetric geometry for a user. A geometric modeling environment 118 can be used as a platform where the associativity is central to the modeling paradigm.

Real-Time Volumetric Associative and Parametric Modeling

Figure 1C:
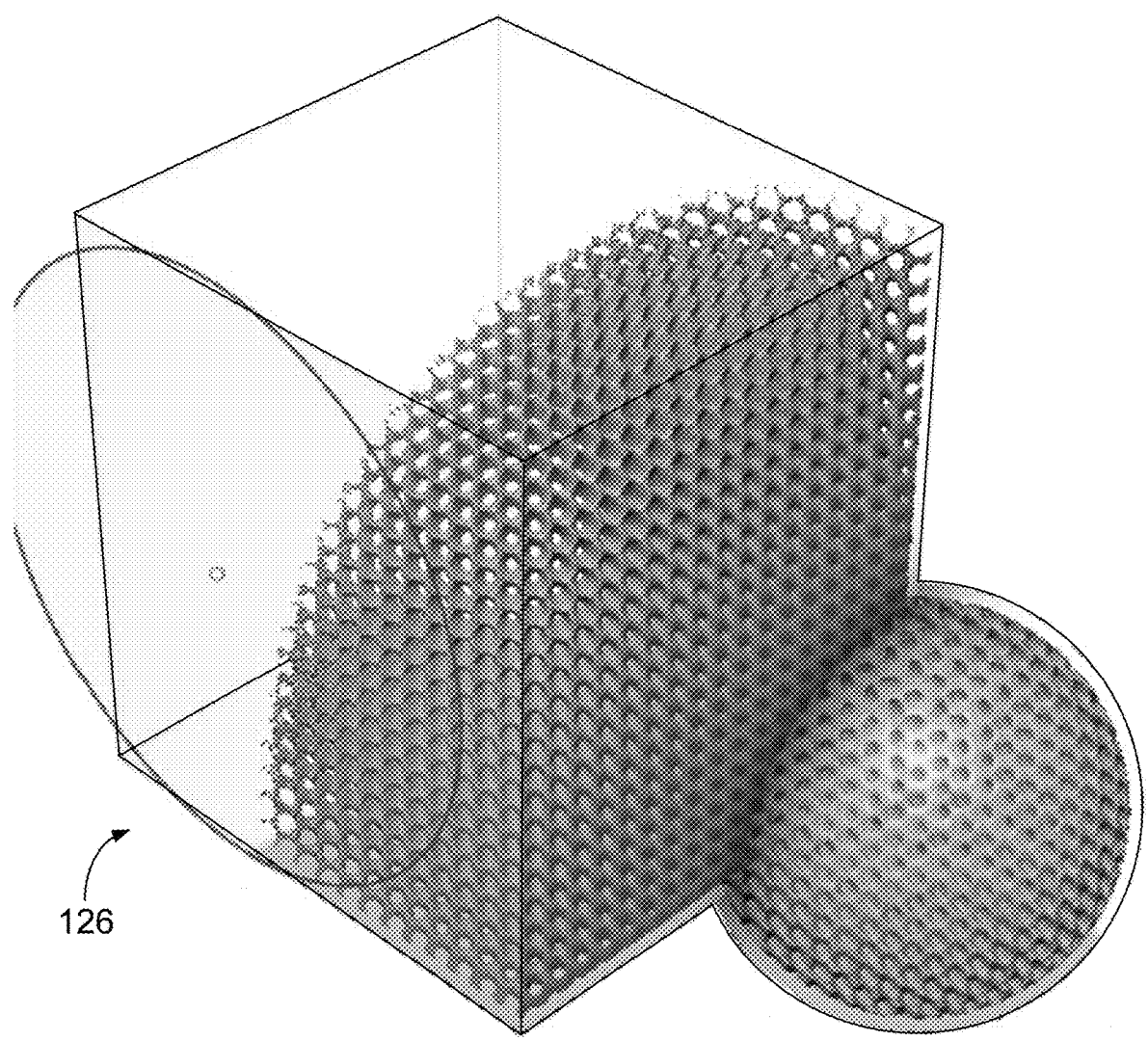

VKR in a geometric modeling environment 118 uses signed distance fields wrapped around any referenceable geometric object (points, curves, edges, faces bodies, etc.). The association between the distance field and its referenced geometry is live and therefore the user can control aspects of the volumetric model by manipulating conventional geometric objects with the tools already available. FIG. 1C shows an example of such manipulation 126 in a geometric modeling environment 118.

Using distance fields as blocks also allows the user to express relations of proximity (I want the material to become softer as we approach this user facing surface of an object, or I want the lattice to become denser near the contact with a support). Any operation between fields generates a new field that absorbs the previous ones so all relations are maintained and can be edited at any point.

Contextual Evaluation on Demand

Figure 1D:
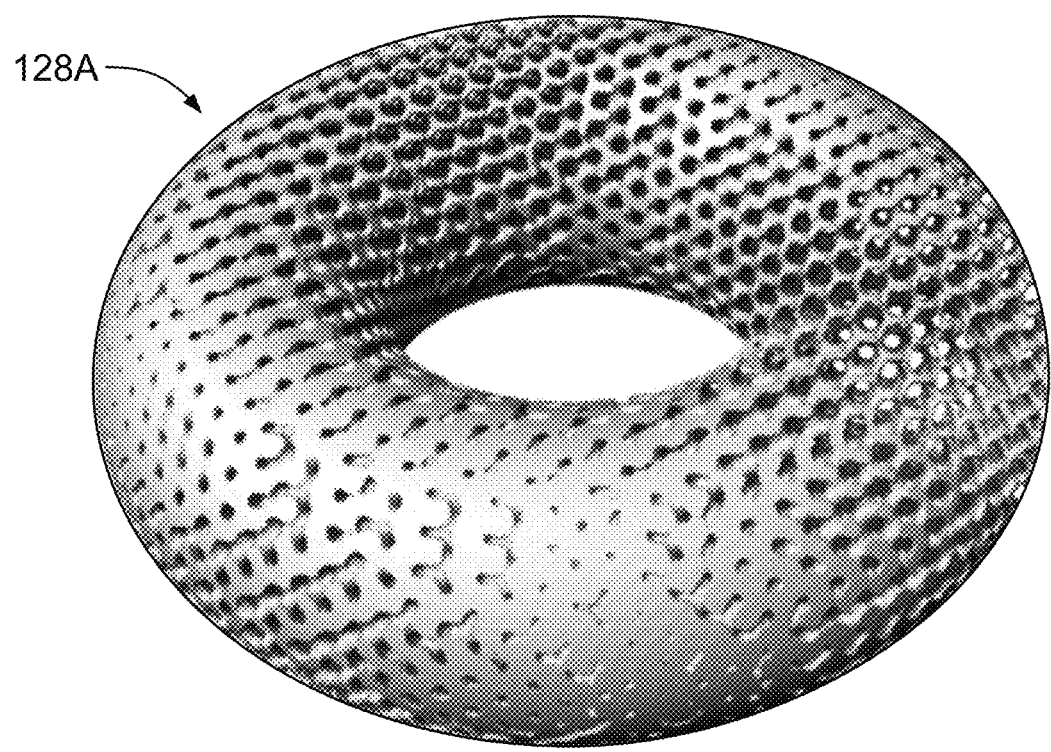
Figure 1D:
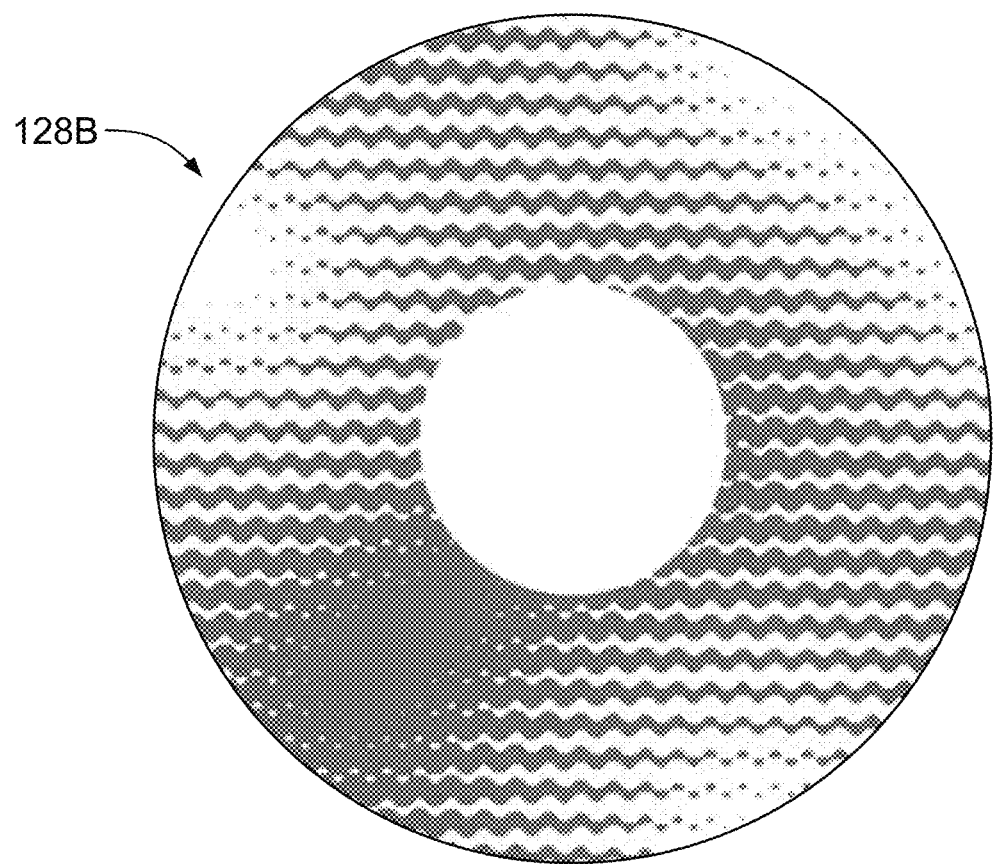

Because VKR VREPs have no intrinsic resolution, a sparse rasterization of the field structure can be generated for real time visualization through 3D textures and marching ray shaders, and this can be expanded to a super fine mesh or bitmap slices for manufacturing. Or some averaged (homogenized) property can be exposed for simulation. FIG. 1D shows examples 128A, 128B of this.

Meso-Structure: Material Design

Of interest is the problem of hierarchical or material design. Current manufacturing technologies push the limit of the designable into smaller and smaller scales. The granularity of control over matter does not reflect the granularity afforded by current CAD software. Approaches to the definition of internal meso-structure usually suffer either from performance issues or presenting a two complicated or too limiting mental model to the user.

Figure 1E:
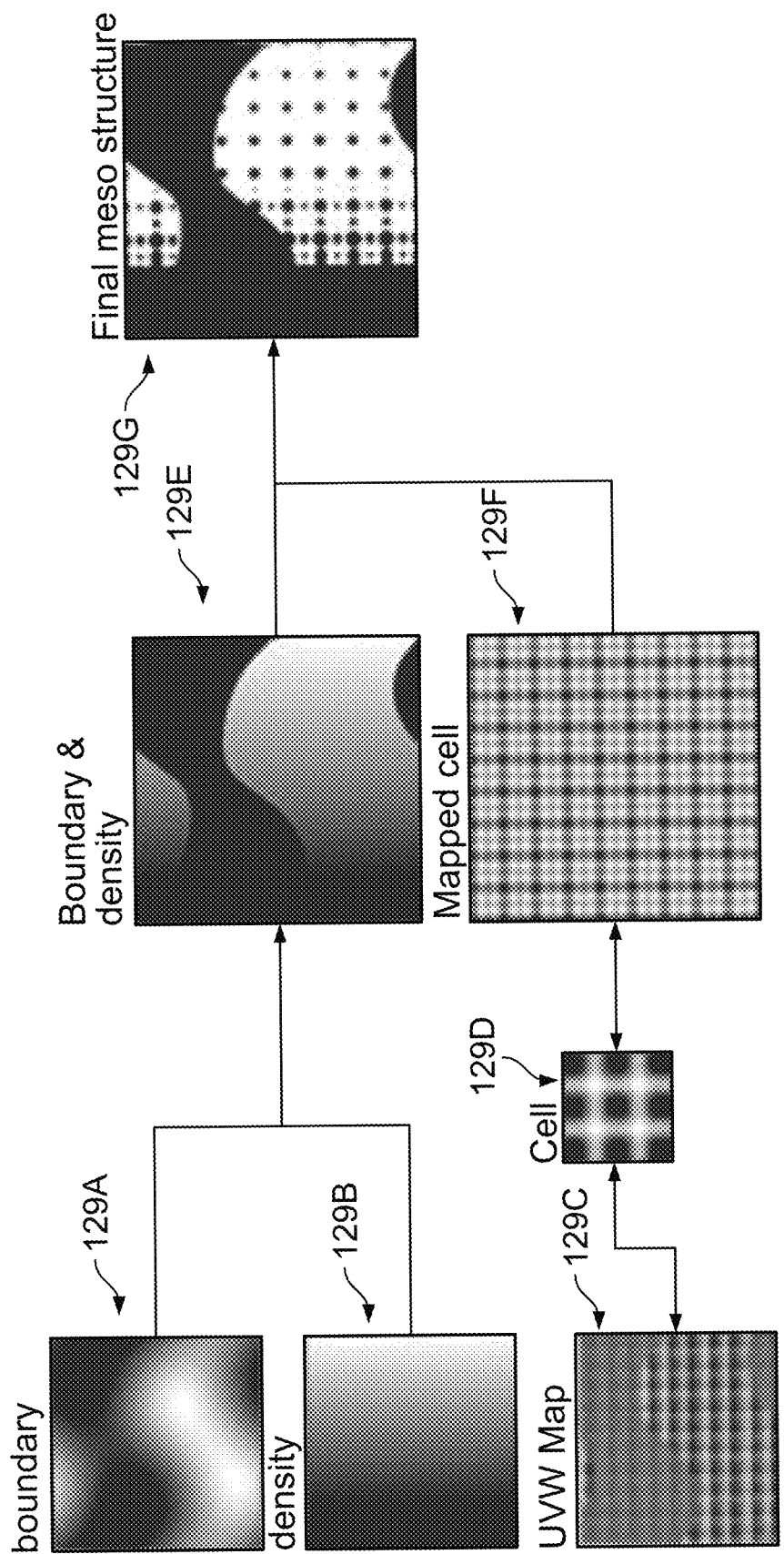
Figure 1F:
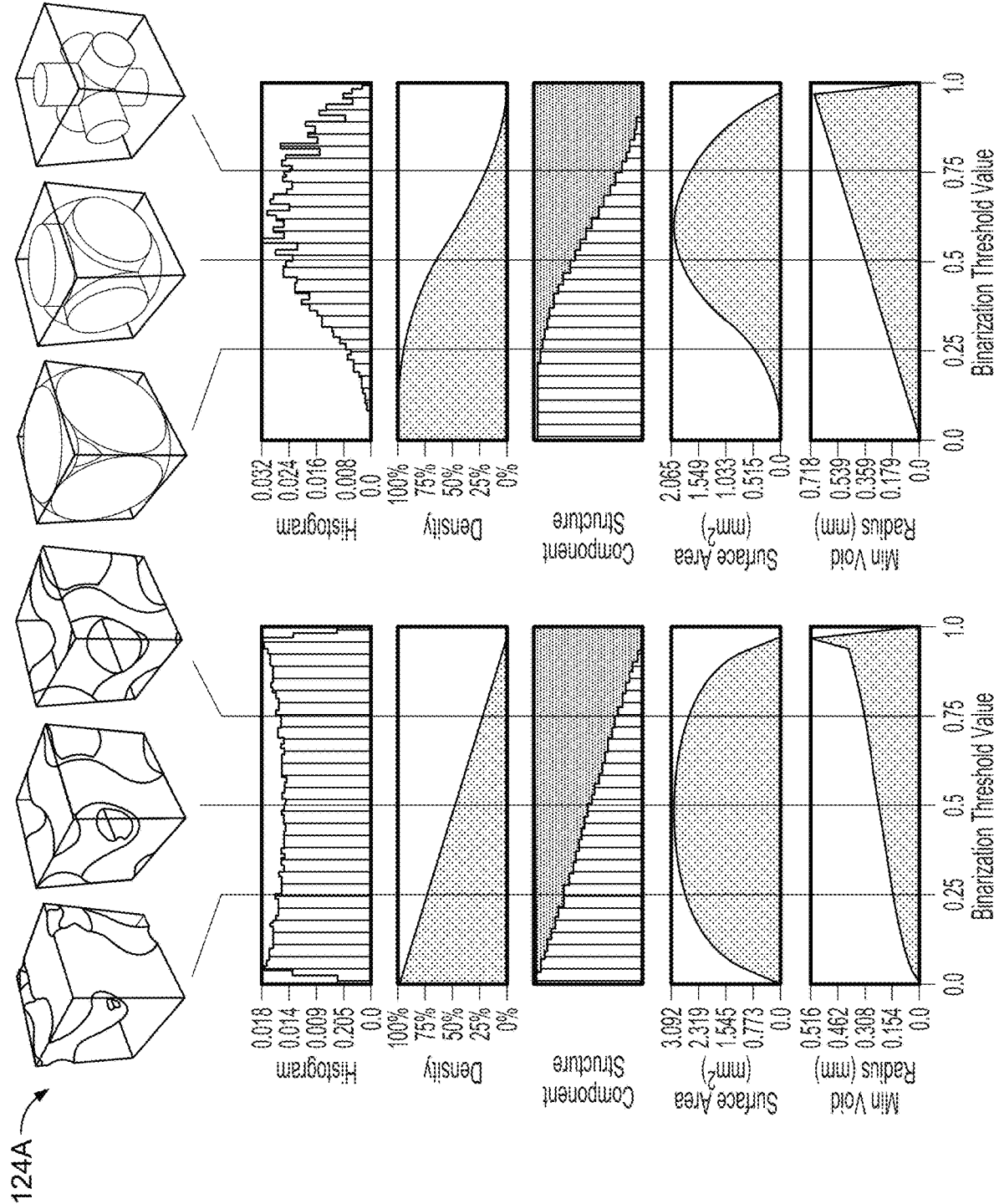
Figure 1G:
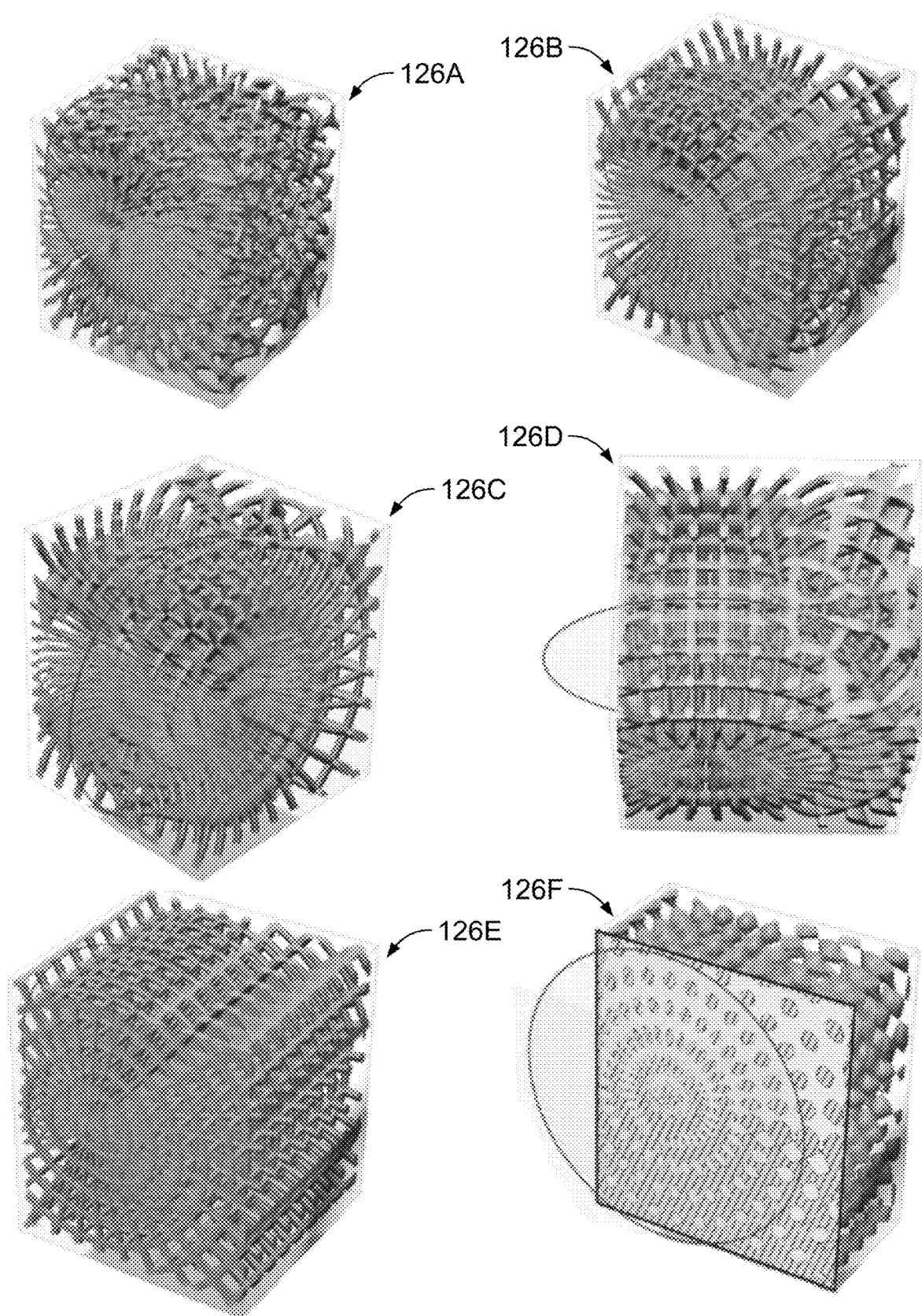

In VKR, an approach is taken that is inspired by 2D printing techniques (halftoning) in combination with the flexibility of texture mapping. FIG. 1E represents this approach, in which a boundary definition 129A (a shape channel, e.g., a B-Rep) is combined with a density definition 129B (a material mixing ratio channel specifying a macroscopic gradient to be achieved) to produce a boundary & density representation 129E, texture coordinates (e.g., a UVW map) 129C interacts with a cell pattern 129D to produce a mapped cell 129F, and the boundary & density representation 129E is combined with the mapped cell 129F to produce a final meso-structure representation 129G. This approach allows one to decouple and control separately three important aspects of the meso-structure so that users and algorithms can focus on the aspects that are more relevant to the problem at hand and simplify the handling of such complex geometries.

a. Porosity or solid/void ratio is determined by a scalar field that takes values between −1 for completely solid to +1 for empty space. The user can easily create these spatial gradients as any scalar field or composition of scalar fields, e.g., by designating the distance to an object where the lattice should become completely solid. Porosity is also correlated with local material strength as well as thermal conductivity. Therefore, a simulation or generative algorithm that is only interested in macroscopic porosity can directly read this field without the need to know the details of the lattice or micro pattern. FIG. 1F shows an example of this fine level of control provided to the user through various user interfaces 124A, which can be provided by the 3D modeling program 118.

b. Volumetric Texture Mapping is defined via a field that evaluates to a triplet of {U,V,W} coordinates for any {X,Y,Z} within the body. This enables the user to control directionality and scaling of the meso-structure. Because the meso-structure shrinks, warps and expands proportionally, this does not affect the porosity. Fine control over mapping is usually related to directional effects. For example, the user wants to align a lattice to the principal stresses derived from a simulation. This enables the ability to define anisotropic material and control the change in the anisotropy from point to point in space. Of particular interest is the generation of conformal grids, that is maps where the lattice axes align with some geometry and which the user can control in real time. Two examples of this are:

i. Wrap around curve UVW mapping, allows the user to define a lattice that wraps around a designated curve. The curve acts as the core of the lattice. This is achieved by the curve generating a three-dimensional field of UVW texture coordinates. For a sample point in space the U coordinate is defined along the curve (using length parameter at closest point). The second coordinate V wraps around the curve (using the angle of the sample point within a rotation invariant frame at the closest point on the curve). The third coordinate W is defined by distance of the sample point to the curve. FIG. 1G shows examples 126A, 126B, 126C, 126D of this.

ii. Extrude from curve UVW mapping, is another type of conformal lattice grid generator. Here the sample point is first projected onto the average plane of the curve. The U coordinate is the length along the curve of the closest point to the projected sample point. The V coordinate is the distance to the curve's plane and the W coordinate is the distance to the curve itself. FIG. 1G shows examples 126E, 126F of this.

c. The cell structure represents a procedural or predefined pattern that includes a scalar field defined in the unit box and takes values between −1 and +1 with 0 representing a levelset that encompasses 50% of the volume of the unit box. This cell determines the local topology and geometry of the meso-structure at different porosity levels. It also enables a unified approach to latticing and porosity design (open and closed cell, cellular materials) something that is challenging for node and strut lattice models. The shape of this cell may be associated or driven by factors that have to do with drainage or flow (micro fluidics), acoustics, biology (medical applications were tissue growth needs to be promoted), etc. Users can define a cell in several ways. Since the cell itself is a field, it can be defined by a preset or user provided mathematical formula, or as a distance field around a set of geometries that define a skeleton for the cell.

Figure 2A:
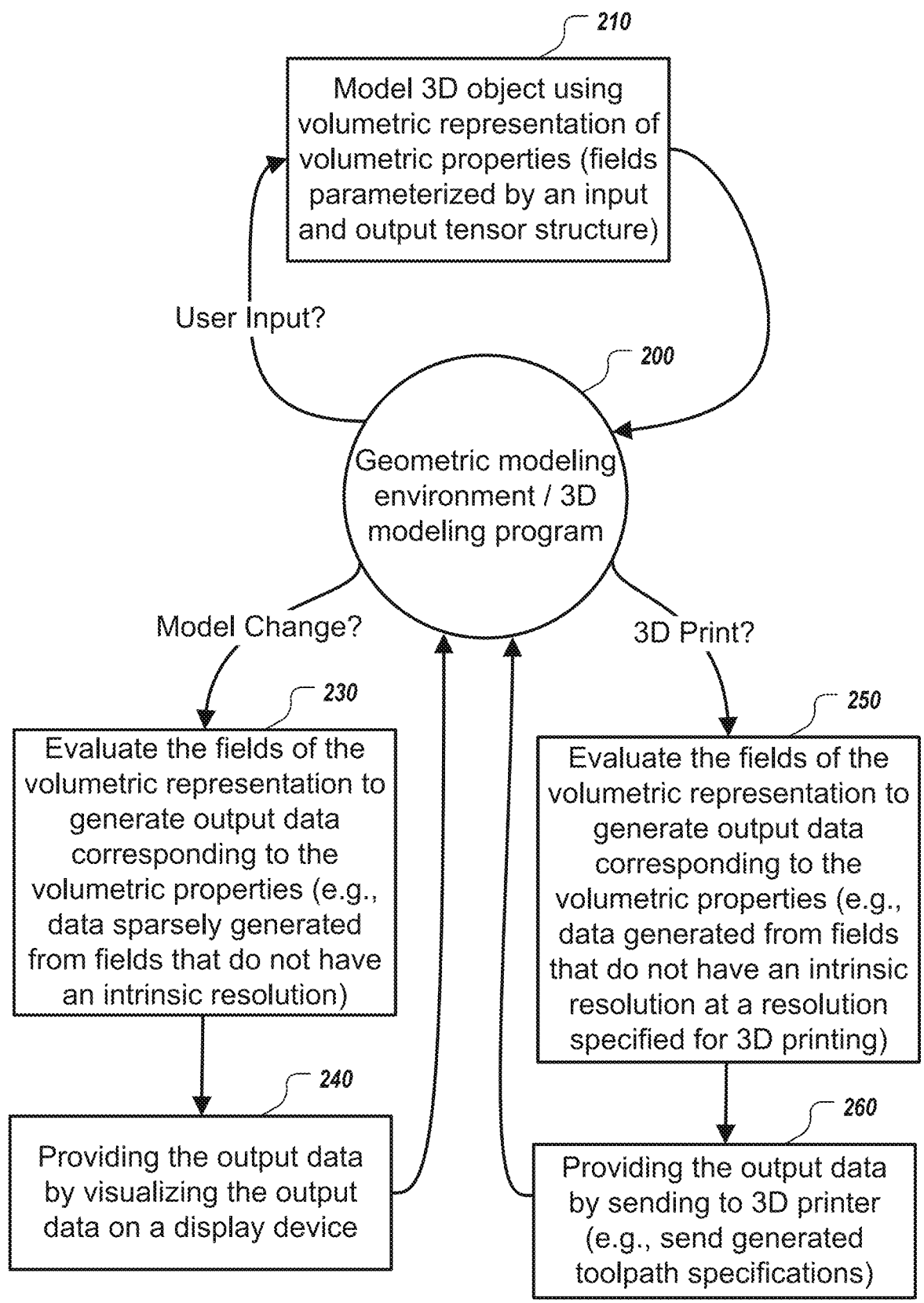
FIGS. 2A-2B show an example of processes that use a volumetric kernel representation for 3D modeling an object to facilitate visualization of the 3D model of the object on a display device and 3D printing of the object from the 3D model.
Figure 2B:
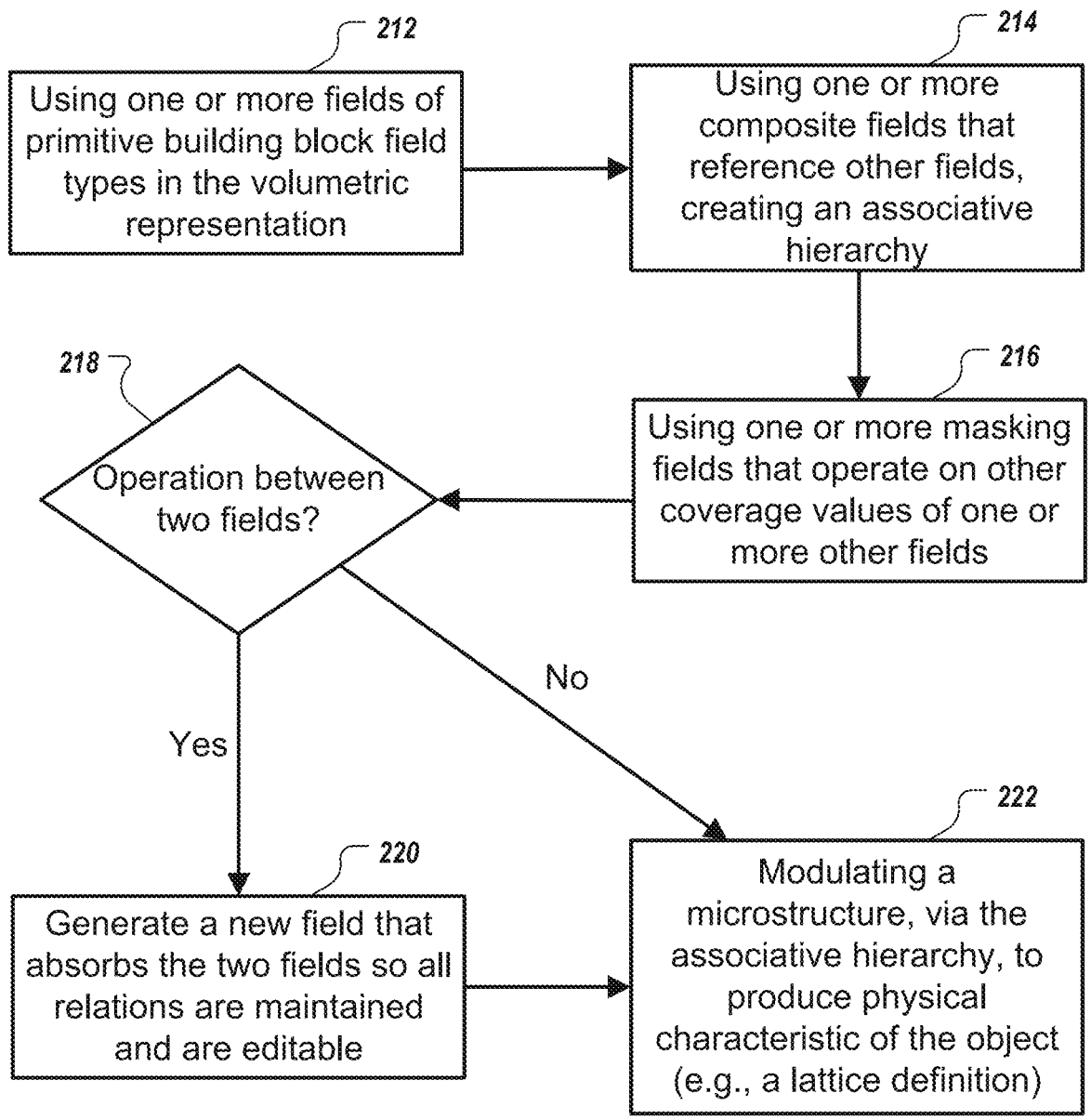

FIGS. 2A-2B show an example of processes that use a volumetric kernel representation for 3D modeling an object to facilitate visualization of the 3D model of the object on a display device and 3D printing of the object from the 3D model. A 3D modeling program provides a geometric modeling environment 200 in which various types of 3D models of physical objects can be designed, including the design of new materials using a hierarchical modeling structure, as described in this document. In response to user input, a 3D object is modelled 210 using the volumetric representation of volumetric properties, which includes fields parameterized by an input and output tensor structure.

The fields of the volumetric representation determine the volumetric properties of the physical object, which can include material mixing and porosity within a 3D space of the 3D object. One or more of the fields map tensor output of one or more first fields to tensor input of one or more second fields. Using this representational structure can provide a unified framework for geometry manipulation and composition that encompasses both discrete and continuous representations of materials in the 3D space of the 3D object.

The field(s) that map tensor output from first field(s) to tensor input for second field(s) are effectively transformation field(s) that determine how the other fields are distributed in space. This 3D modeling framework provides a hierarchy that facilitates material design applications and latticing (hierarchical material design). One functional composition that results in a field can be input that creates the microstructure that is replicated and controlled through a transformation field and distributed in space. In this way, the user can control all the aspects of porosity and latticing in space using the same kind of patterns of interaction and definitions with the user interface of the CAD program. Note that latticing is but one application of the described approach for defining volumetric micro-patterns as well as their distribution and variation in 3D space. In general, these micro-patterns can be used to effect lattice, porosity, composites, halftoning and other specific applications, within a 3D modeling environment that provides a logical hierarchy of dependency of definitions of fields (the associative hierarchy of fields) and also a more geometric hierarchy that manifests in 3D space as spanning two different scales (micro/macro).

This hierarchy material design approach, which uses functional composition with some of the functions being transformation fields, improves the storage of the 3D model and the user interface, facilitating the design of new material, e.g., for additive manufacturing.

The fields can be included in channels in a hierarchical design, where the same compositional principle becomes the input for a transformation field. Note that the fields of the volumetric representation of the physical object, which can define physical characteristics that vary from point to point within a volume of the three dimensional object, need not have an intrinsic resolution. Thus, they can be evaluated differently depending on the context, e.g., based on the level of detail needed for the current workflow.

For example, when there is a model change, the fields of the volumetric representation can be evaluated 230 to generate output data corresponding to the volumetric properties for purposes of rendering to a display device. The evaluation 230 can include evaluating at least one of the fields using coverage values that determine compositing behavior when mapping the tensor output of a first field to the tensor input of a second field, to generate output data corresponding to the volumetric properties. Compositing using the tensor structure described can involve using a field that produces a fragment value as the value of the property plus a coverage value. The coverage value informs the modeling environment how to compose the property over the whole. Thus, each property can be accompanied by a coverage field to control exactly how composition happens when evaluating 230 the fields of the 3D model.

In the context of visualization, the evaluating 230 can include generating the output data sparsely, such that the level of detail (resolution) generated for the output data is only as great as is needed for provision to a particular display device in a current context of the user interface, which minimizes processing resource and/or memory usage. Thus, the output data is provided 240 by visualizing the output data on the display device, and the user can interact with the user interface to explore the physical characteristics (which vary from point to point within a volume of the 3D object in accordance with the volumetric properties) in the user interface and make further design changes, as desired.

Other workflows are also possible, such as output for additive (or other) manufacturing. For example, when it is time to 3D print the physical object from the model, evaluating 250 can include generating the output data at a resolution specified for 3D printing. The evaluation 230 can include evaluating at least one of the fields using coverage values that determine compositing behavior when mapping the tensor output of a first field to the tensor input of a second field (as described above) to generate output data corresponding to the volumetric properties. The output data is provided 260 by sending the output data to a machine to perform the 3D printing. In some implementations, the generated 250 output data is in a 3D model format (e.g., a document 132) that is sent 260 to another computer for conversion into toolpath specification(s) (e.g., G-code or other 3D printer instructions). In some implementations, the generated 250 output data is the toolpath specification(s) (e.g., G-code or other 3D printer instructions in a document 160) that are sent 260 to the 3D printer to cause the physical object to be manufactured.

FIG. 2B shows an example of processes that can be included in the modeling 210 of FIG. 2A. In some implementations, the modeling 210 includes using 212 one or more fields of primitive building block field types in the volumetric representation. As described above, these primitive building block field types can include signed distance fields around geometric entities, dense grid-based fields, and fields that extend local coordinate systems to produce conformal lattices. The modeling 210 can also include using 214 one or more composite fields that reference other fields in the volumetric representation.

As described above, these composite fields create an associative hierarchy of tensor to tensor maps, which provides significant power and flexibility in the 3D modeling framework. For example, the associative hierarchy of tensor to tensor maps can include a definition of a microstructure that is modulated 222, via the associative hierarchy, through the 3D space of the 3D object to produce at least a portion of the physical characteristics that vary from point to point within the volume of the three dimensional object. This facilitates the design of new materials by simplifying the user's interaction with the 3D modeling environment to vary the properties of the object in 3D space. For example, the user can define the modulation 222 of the microstructure through the 3D space of the 3D object to produce a lattice for the 3D object.

In some implementations, the modeling 210 includes using 216 one or more masking fields in the volumetric representation, where the masking field(s) operate on other coverage values of one or more other fields to affect compositing behavior of the other coverage values. As explained above, using masking facilitates maintaining the distinct properties in the regions of space that different solids occupy. Moreover, in some implementations, any time there is an operation 218 between two fields of the volumetric representation, a new field is generated 220 that absorbs the two fields so all relations are maintained and are editable at any point therein.

Figure 3:
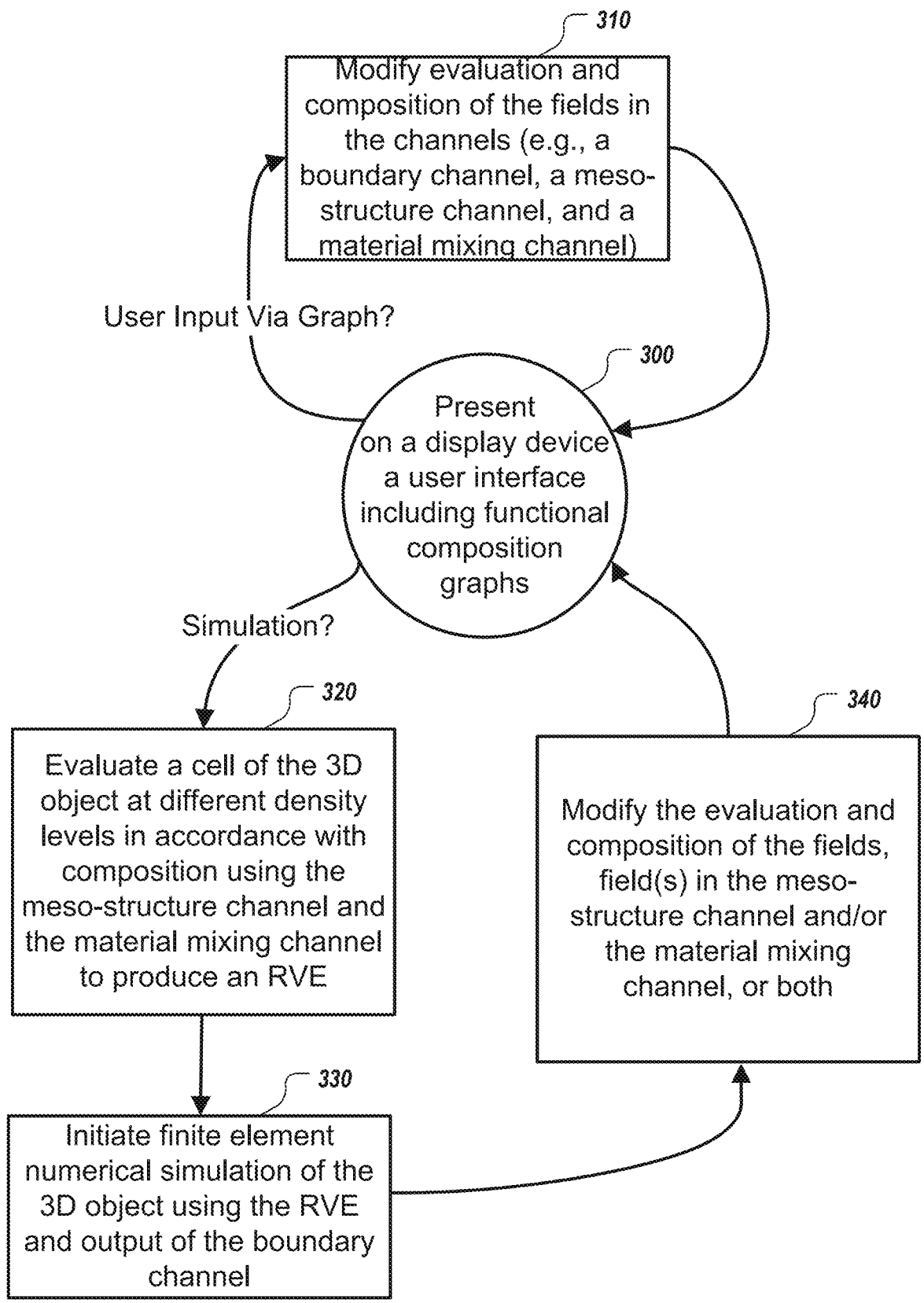
FIG. 3 shows an example of a process for designing a physical object using the volumetric kernel representation.

FIG. 3 shows an example of a process for designing a physical object using the volumetric kernel representation. In some implementations, a user interface (UI) is presented 300 on a display device, where the UI includes functional composition graphs usable to modify the 3D model of the physical object being designed. These UI based functional composition graphs represent and reflect the underlying functional composition graph data structure of the volumetric representation, with a hierarchy of fields in channels, and thus provide the user with fine control over the associative structure of fields that compose the 3D model of the physical object.

In some implementations, the fields of the volumetric representation are contained in various channels, which include a boundary channel that specifies an absolute boundary of one or more defined properties, a meso-structure channel that produces the porosity within the three dimensional space, and a material mixing channel that produces the material mixing within the three dimensional space. The functional composition graphs indicate evaluation and composition of the fields in the channels of the volumetric representation of the three dimensional object as specified by at least one of the fields.

In response to user input via one or more of the functional composition graphs, the evaluation and composition of the fields in the volumetric kernel representation can be modified 310. This modification 310 can be within a given channel or can affect the interaction of different channels, such as the boundary channel, the meso-structure channel, and the material mixing channel. Thus, these and other channels and fields can be modified 310 to change the way the data in the volumetric kernel representation is evaluated and composited to generate the current stage of the 3D model.

In addition, the systems and techniques described in this application can be combined with numerical simulation systems and techniques. In some implementations, in response to a user selection of a type of simulation, a cell of the 3D object is evaluated 320 at different density levels in accordance with composition using the meso-structure channel and the material mixing channel. This results in the generation of a homogenized representative volume element (RVE) for use in numerical simulation. Finite element (FE) numerical simulation of the 3D object can then be initiated 330 using the homogenized RVE and output generated with the boundary channel.

Then, responsive to results of the FE numerical simulation of the 3D object, the evaluation and composition of the fields can be modified 340, one or more fields in the meso-structure channel or the material mixing channel or both can be modified 340, or both the evaluation and composition of the fields and the one or more fields can be modified 340. This modification 340 can be automatic or partially or fully controlled by the user. Various types of modifications 340 can be made based on the results of various type of numerical simulation. In some implementations, the modifying 340 responsive to the results of the simulation includes producing a conformal lattice within the 3D object that follows principal stress directions indicated by the results of the FE numerical simulation.

The present systems and techniques work naturally with homogenization techniques used in mechanical simulations, as the properties of the single cell element can be analyzed at different density levels using homogenization theory (treating as a representative volume element) and then pass these homogenized material definitions to a FE simulation solver without having to simulate all the fine structure. In addition, rather than only use traditional FE simulation, machine learning techniques can also be used to map and therefore compress almost instantaneously a micropattern to its homogenized material matrix. Note that this method also works in the opposite direction, where a localized cell shape can be generated that best meets certain macro conditions (e.g., strain) that are extracted from a sparse simulation run.

The results of the simulation 330 and modification 340 can in turn be further edited 310 by the user, e.g., using the functional composition graphs. Note that a functional composition graph is a mechanism that combines various associative volumetric representations (e.g., voxel grids, unstructured tetrahedral grids, procedural and functional elements) in order to produce various volumetric fields that represent different spatially varying properties, i.e., outputs channels.

Figure 4:
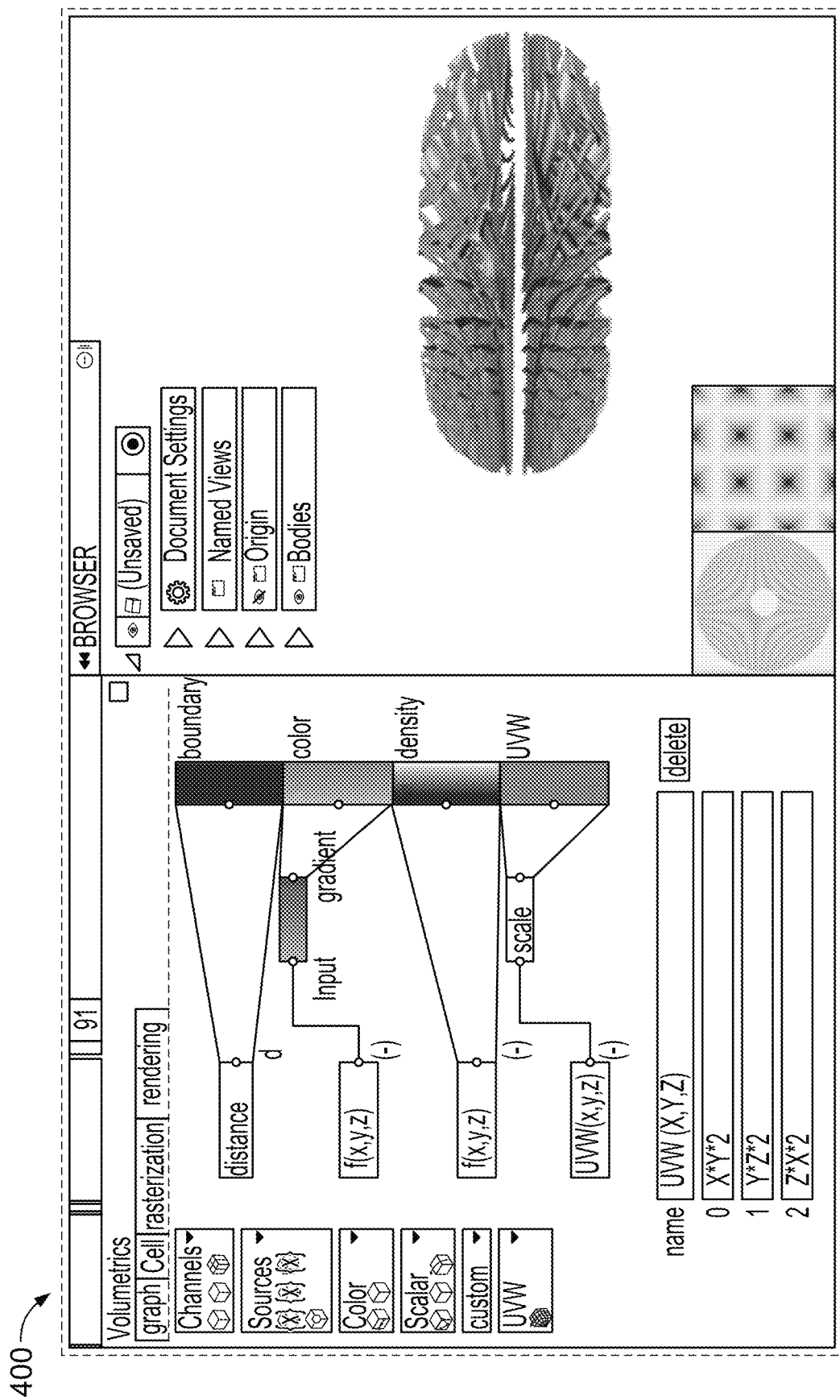
FIGS. 4-6 show examples of user interfaces including representations of functional composition graphs usable with the volumetric modeling systems and techniques described in this document.
Figure 5:
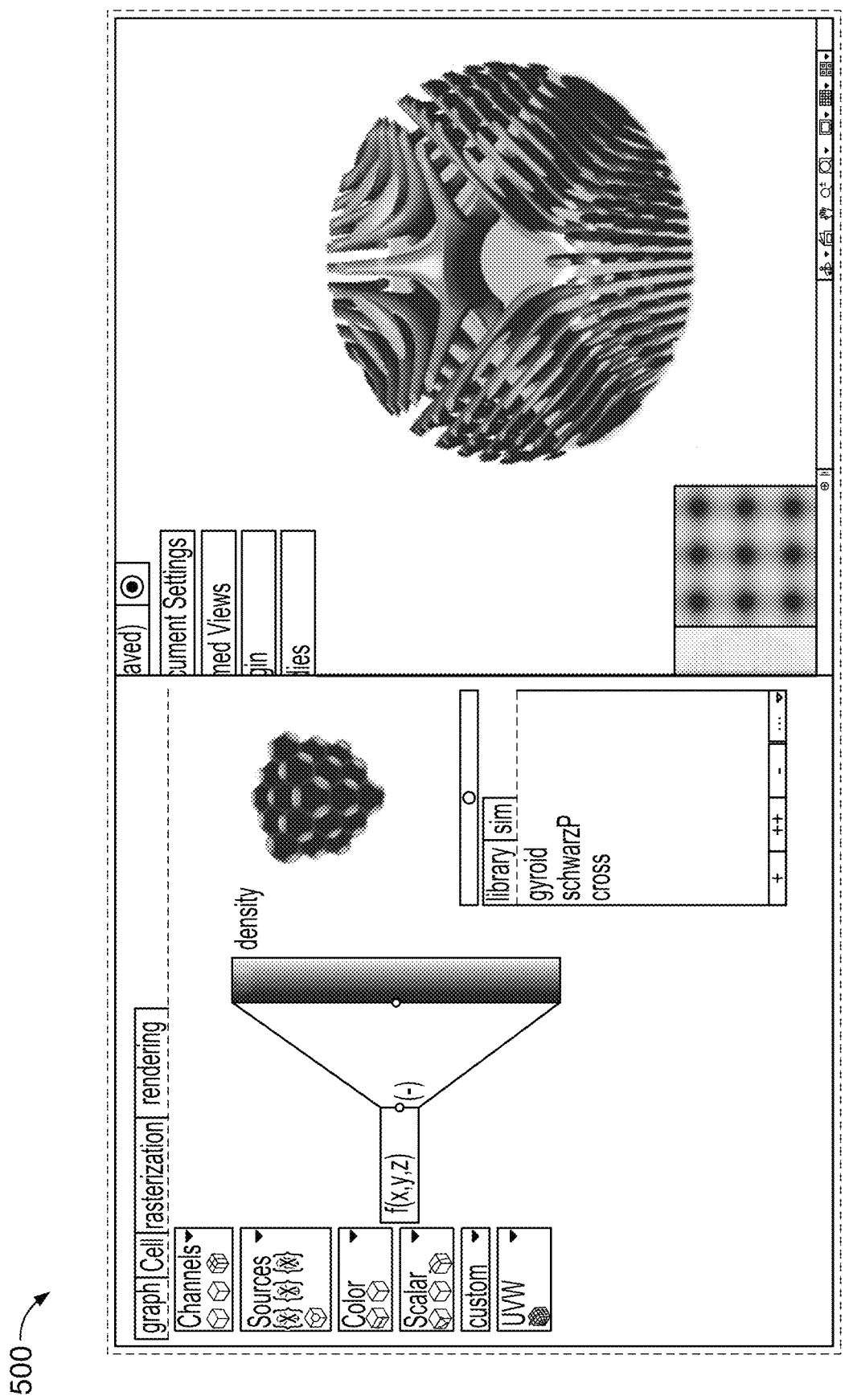
Figure 6:
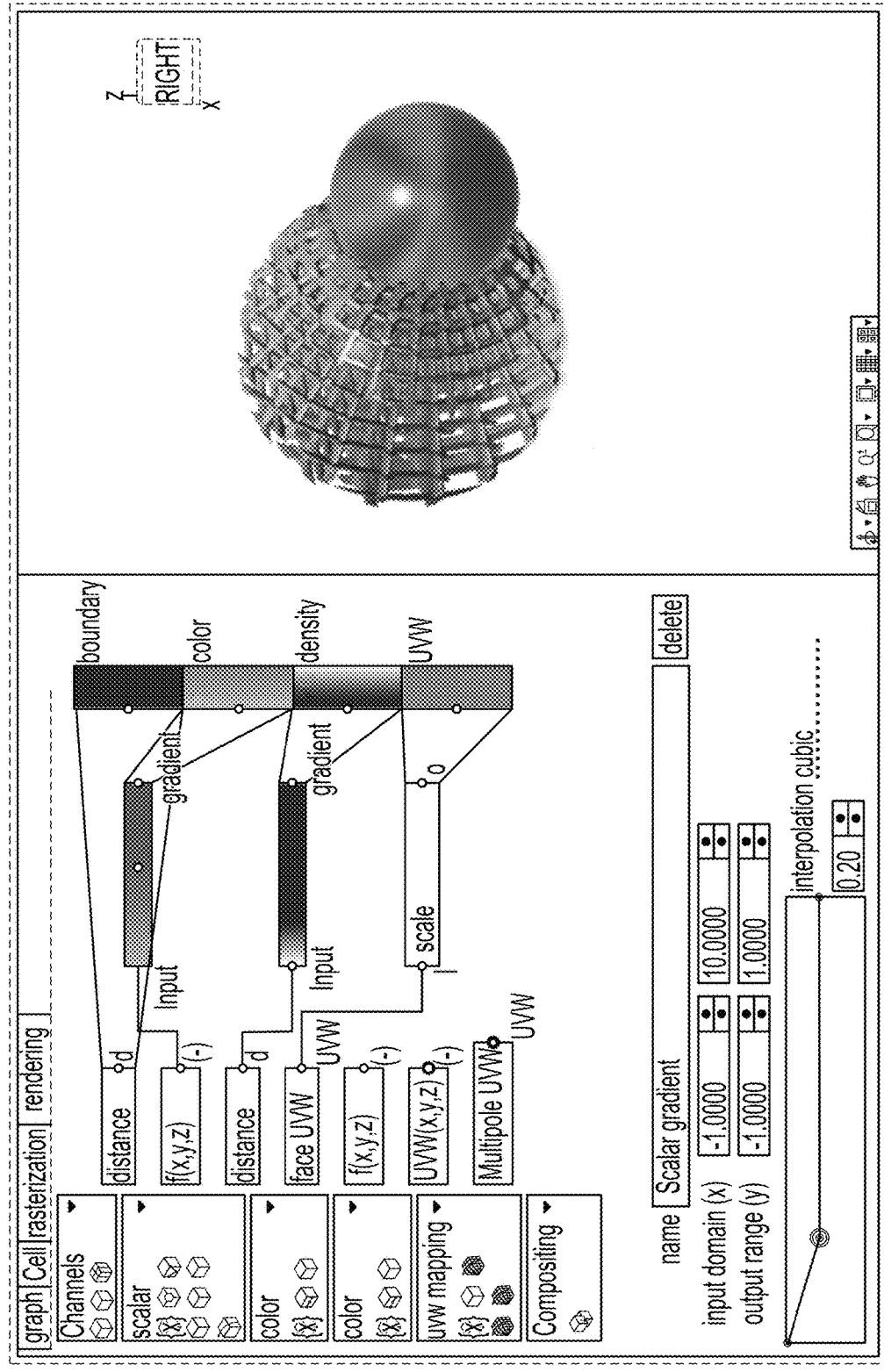

FIGS. 4, 5 and 6 show examples of user interfaces 400, 500 and 600 including representations of functional composition graphs usable with the volumetric modeling systems and techniques described in this document. In some implementations, there is a macro graph that controls the overall shape and macroscopic distribution of properties. This macro graph can contain various channels for shape, color, material mixing, etc. In regard to the hierarchical design application, the graph can contain two channels, a scalar one that determines the density (solid/void porosity ratio) at each location in space and a three component vector one that determines the mapping of the micro geometry acting as a volumetric texture coordinates generator. The first channel here is referred to as the density channel, and the second channel here is referred to as the UVW channel.

The microstructure itself can be defined by one or more functional composition graphs that have at least one density channel each. These graphs can be assumed to define triply periodic density distributions bound within a unit cell, where these fields correspond to the cell density channels. In order to determine if a point in space is solid or void, AVK can first compute the macro density value and the UVW coordinates from the macro graph's density and UVW channels, and then use the UVW coordinate to lookup the density of the microstructure from the micro graph's cell density channel. The combination of the two density values where the macro value acts as the levelset isovalue for the micro, yields the final solid or void determination.

Note that a UVW field can be integrated in the same graph as the rest of the volumetric fields and allows them to share common references, for example, a geometric element that informs both the distribution of color as well as density. Also, any suitable graph can be used as the micro graph of another shape so any definition of volumetric geometry can become a micro pattern that defines the microstructure.

Therefore, the same process and representation is used regardless of whether a macro model or a microstructure is being defined.

In addition, the cell definition itself can be a fully functional graph that is defined in the exact same way as the macro graph, and therefore reflects the idea of a hierarchical approach where the exact same representation and methods are used at two different scales. The cell density channel does not provide a single topology but rather encodes the shape of the microstructure at different macro densities through the various levelsets of an implicit field. The procedural UVW channel provides a unified framework for both affine and nonlinear distortions of the generated lattices with fine control over local scaling, rotation and warping. Through this the user can control at a very fine level the alignment of microstructure, which is important for both structural reasons (e.g., aligning reinforcement with macro principal strength directions) and optical effects (e.g., producing anisotropic effects in the transmission of light or visibility through a medium).

The density channel allows the user to focus separately on the actual solid void ratio (or bi-material mixing) as a continuous field in itself. Therefore, the user can use simple volumetric gradient definition techniques to define the overall macro distribution of density that is then realized through the intricate structure of the modulated micro field.

By splitting the problem of defining an intricate, spatially varying latticing or porosity pattern into the definition of three fields (the macro density, macro UVW map and micro cell density) the designer is enabled to easily control various aspects of the macro material behavior as well as use macro modelling techniques to define micro structure. For example, conformal lattices that follow desirable directions in 3D space (e.g., principal stress directions derived from a macro mechanical simulation) can be readily created. By isolating the procedural UVW map, the user can control directionality by using a plethora of tools and composited functions without having to deal with the intricacies of the micro structure and without affecting the solid void ratio (which is controlled by the modulating effect of the macro density channel).

The user can also define and manipulate control curves to extend their parameterization to the full 3D space in order to create lattices that align with the curves' tangent directions locally (e.g., creating an internal backbone in a structure where all lattice elements converge). This enables a control mechanism for pattern directionality that goes beyond what is available from standard CAD tools. In addition, this method allows the use of low resolution evaluation of the macro fields and computation of the final dependent UVW lookup on the GPU (Graphics Processing Unit) during rendering, which enables real time rendering of hyper intricate structures.

Figure 7:
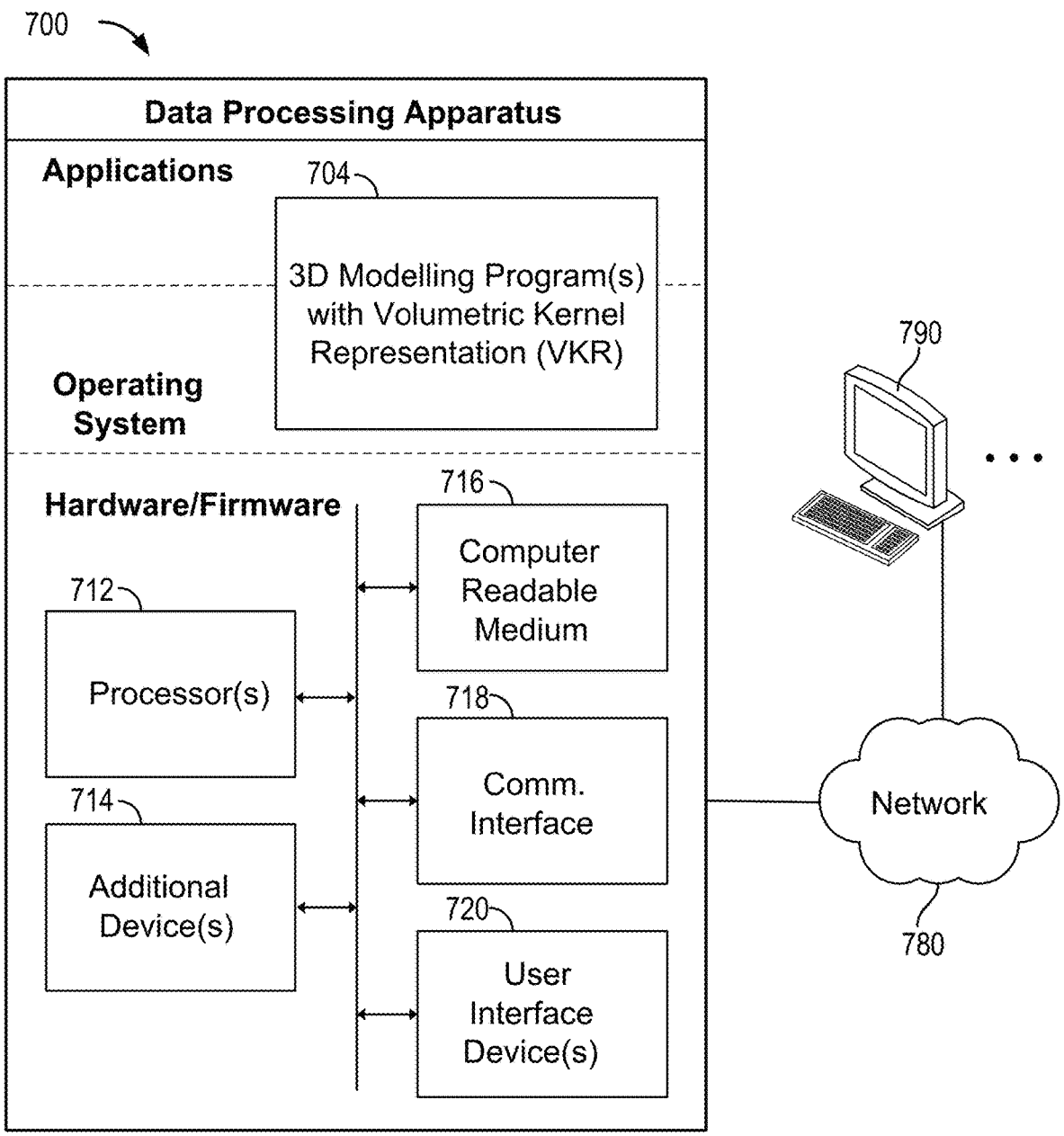
FIG. 7 is a schematic diagram of a data processing system.

FIG. 7 is a schematic diagram of a data processing system including a data processing apparatus 700, which can be programmed as a client or as a server. The data processing apparatus 700 is connected with one or more computers 790 through a network 780. While only one computer is shown in FIG. 7 as the data processing apparatus 700, multiple computers can be used. The data processing apparatus 700 includes various software modules, which can be distributed between an applications layer and an operating system. These can include executable and/or interpretable software programs or libraries, including tools and services of one or more 3D modeling programs 704 that implement the systems and techniques described herein. Thus, the 3D modeling program(s) 704 can be CAD program(s) 704, computer animation program(s) 704, or other programs that implement VKR as described in this document. Using the systems and techniques described in this document, the material to be used with 3D printing technologies (which are increasingly enabling designers to define the distribution and variation of materials in ever smaller scales) can become the object of design. By manipulating the three-dimensional structure of material at the microscale (porosity, open or closed form latticing and composites) the designer can define variable material properties that may be mechanical, optical or thermal and that manifest at the macro scale.

However, the high complexity and intricacy of these structures benefits from a different approach to modeling in order to reduce the complexity to the user. To address this technical issue, the AVK systems and techniques described in this document enable the realization of hierarchical design workflows that span the micro and macro scales, providing the ability to do hierarchical multiscale modelling of functionally graded materials. The user is enabled to design and manipulate these 3D models in a volumetric modeling environment, where the topology, transformation and density of the microstructure is decoupled into three channels, which can be controlled by a nested functional composition graph, in a CAD program.

Note that, as used herein, "a CAD program" refers to any suitable program providing a geometric modeling environment, including those used to design physical structures that meet specified design requirements, regardless of whether or not the program is capable of interfacing with and/or controlling specific manufacturing equipment. Thus, CAD program(s) 704 can include Computer Aided Industrial Design (CAID) program(s), Computer Aided Engineering (CAE) program(s), Computer Aided Manufacturing (CAM) program(s), etc. The program(s) 704 can run on the local computer, remotely on a computer of one or more remote computer systems (e.g., one or more third party providers' one or more server systems accessible by the computer via the network 780) or both locally and remotely. Thus, a CAD program 704 can be two or more programs that operate cooperatively on two or more separate computer processors in that a program 704 operating locally at a first computer can offload processing operations (e.g., generative design and/or VKR processing) "to the cloud" by having one or more programs 704 on one or more remote computers perform the offloaded processing operations.

Further, the program(s) 704 can implement physical simulation operations (FEA or other), generative design operations (e.g., using level-set based method(s) for generative design), manufacturing control operations (e.g., generating and/or applying toolpath specifications to effect manufacturing of designed objects), and/or movie animation production. The number of software modules used can vary from one implementation to another. Moreover, the software modules can be distributed on one or more data processing apparatus connected by one or more computer networks or other suitable communication networks.

The data processing apparatus 700 also includes hardware or firmware devices including one or more processors 712, one or more additional devices 714, a computer readable medium 716, a communication interface 718, and one or more user interface devices 720. Each processor 712 is capable of processing instructions for execution within the data processing apparatus 700. In some implementations, the processor 712 is a single or multi-threaded processor. Each processor 712 is capable of processing instructions stored on the computer readable medium 716 or on a storage device such as one of the additional devices 714. The data processing apparatus 700 uses the communication interface 718 to communicate with one or more computers 790, for example, over the network 780. Examples of user interface devices 720 include a display, a camera, a speaker, a microphone, a tactile feedback device, a keyboard, a mouse, and VR and/or AR equipment. The data processing apparatus 700 can store instructions that implement operations associated with the program(s) described above, for example, on the computer readable medium 716 or one or more additional devices 714, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. In some implementations, the compositing process is applicable to any data that describes a distribution of properties in space, whether that space is 3D, 2D or 1D. Other embodiments are within the scope of the following claims. In addition, actions recited in the claims can be performed in a different order and still achieve desirable results.

What is claimed is:

1. A method comprising:
    modeling a three dimensional object using a volumetric representation of volumetric properties including material mixing and porosity within a three dimensional space of the three dimensional object, the volumetric representation comprising fields that determine the volumetric properties, each of the fields is parameterized by an input and output tensor structure, and at least one of the fields maps tensor output of a first of the fields to tensor input of a second of the fields to provide a unified framework for geometry manipulation and composition that encompasses both discrete and continuous representations of materials in the three dimensional space of the three dimensional object;
    evaluating the fields of the volumetric representation, including evaluating the at least one of the fields using coverage values that determine compositing behavior when mapping the tensor output of the first of the fields to the tensor input of the second of the fields, to generate output data corresponding to the volumetric properties; and
    providing the output data for the three dimensional object, wherein the three dimensional object has physical characteristics that vary from point to point within a volume of the three dimensional object in accordance with the volumetric properties;
    wherein the modeling comprises using the volumetric representation comprising one or more composite fields that reference other fields, creating an associative hierarchy of tensor to tensor maps, and the associative hierarchy of tensor to tensor maps includes a definition of a microstructure that is modulated, via the associative hierarchy, through the three dimensional space of the three dimensional object to produce at least a portion of the physical characteristics that vary from point to point within the volume of the three dimensional object.

2. The method of claim 1, wherein the fields of the volumetric representation do not have an intrinsic resolution, the evaluating comprises generating the output data sparsely, and the providing comprises visualizing the output data on a display device.

3. The method of claim 1, wherein the fields of the volumetric representation do not have an intrinsic resolution, the evaluating comprises generating the output data at a resolution specified for three dimensional printing, and the providing comprises sending the output data to a machine to perform the three dimensional printing.

4. The method of claim 1, wherein the modeling comprises using the volumetric representation comprising one or more fields of primitive building block field types comprising signed distance fields around geometric entities, dense grid-based fields, and fields that extend local coordinate systems to produce conformal lattices.

5. The method of claim 4, wherein the modeling comprises using the volumetric representation comprising one or more composite fields that reference other fields, creating an associative hierarchy of tensor to tensor maps.

6. The method of claim 1, wherein modulation of the microstructure through the three dimensional space of the three dimensional object produces a lattice for the three dimensional object.

7. The method of claim 1, wherein the modeling comprises using the volumetric representation comprising one or more masking fields that operate on other coverage values of one or more other fields to affect compositing behavior of the other coverage values.

8. The method of claim 1, wherein any operation between two of the fields of the volumetric representation generates a new field that absorbs the two fields so all relations are maintained and are editable at any point therein.

9. The method of claim 1, wherein the fields of the volumetric representation are contained in channels comprising a boundary channel that specifies an absolute boundary of one or more defined properties, a meso-structure channel that produces the porosity within the three dimensional space, and a material mixing channel that produces the material mixing within the three dimensional space.

10. The method of claim 9, comprising:
    presenting on a display device a user interface showing functional composition graphs indicating evaluation and composition of the fields in the channels of the volumetric representation of the three dimensional object as specified by at least the at least one of the fields;
    receiving user input through the functional composition graphs of the user interface; and
    modifying the evaluation and composition of the fields in the channels of the volumetric representation of the three dimensional object in accordance with the user input.

11. The method of claim 10, comprising:
using the evaluation and composition of the fields to evaluate a cell of the three dimensional object at different density levels in accordance with composition using the meso-structure channel and the material mixing channel, thereby generating a homogenized representative volume element;
initiating finite element numerical simulation of the three dimensional object using the homogenized representative volume element and output generated with the boundary channel; and
modifying the evaluation and composition of the fields, one or more fields in the meso-structure channel or the material mixing channel or both, or both the evaluation and composition of the fields and the one or more fields responsive to results of the finite element numerical simulation of the three dimensional object.

12. The method of claim 11, wherein the modifying responsive to the results of the finite element numerical simulation comprises producing a conformal lattice within the three dimensional object that follows principal stress directions indicated by the results of the finite element numerical simulation.

13. A non-transitory computer-readable medium encoding instructions operable to cause data processing apparatus to perform operations that store a representation of a three dimensional (3D) model, and enable user manipulation of the 3D model, the operations comprising:
modeling a three dimensional object using a volumetric representation of volumetric properties including material mixing and porosity within a three dimensional space of the three dimensional object, the volumetric representation comprising fields that determine the volumetric properties, each of the fields is parameterized by an input and output tensor structure, and at least one of the fields maps tensor output of a first of the fields to tensor input of a second of the fields to provide a unified framework for geometry manipulation and composition that encompasses both discrete and continuous representations of materials in the three dimensional space of the three dimensional object;
evaluating the fields of the volumetric representation, including evaluating the at least one of the fields using coverage values that determine compositing behavior when mapping the tensor output of the first of the fields to the tensor input of the second of the fields, to generate output data corresponding to the volumetric properties; and
providing the output data for the three dimensional object, wherein the three dimensional object has physical characteristics that vary from point to point within a volume of the three dimensional object in accordance with the volumetric properties;
wherein the modeling comprises using the volumetric representation comprising one or more composite fields that reference other fields, creating an associative hierarchy of tensor to tensor maps, and the associative hierarchy of tensor to tensor maps includes a definition of a microstructure that is modulated, via the associative hierarchy, through the three dimensional space of the three dimensional object to produce at least a portion of the physical characteristics that vary from point to point within the volume of the three dimensional object.

14. The non-transitory computer-readable medium of claim 13, wherein the fields of the volumetric representation do not have an intrinsic resolution, the evaluating comprises generating the output data sparsely, and the providing comprises visualizing the output data on a display device.

15. The non-transitory computer-readable medium of claim 13, wherein the fields of the volumetric representation do not have an intrinsic resolution, the evaluating comprises generating the output data at a resolution specified for three dimensional printing, and the providing comprises sending the output data to a machine to perform the three dimensional printing.

16. The non-transitory computer-readable medium of claim 13, wherein the modeling comprises using the volumetric representation comprising one or more fields of primitive building block field types comprising signed distance fields around geometric entities, dense grid-based fields, and fields that extend local coordinate systems to produce conformal lattices.

17. The non-transitory computer-readable medium of claim 16, wherein the modeling comprises using the volumetric representation comprising one or more composite fields that reference other fields, creating an associative hierarchy of tensor to tensor maps.

18. The non-transitory computer-readable medium of claim 13, wherein modulation of the microstructure through the three dimensional space of the three dimensional object produces a lattice for the three dimensional object.

19. The non-transitory computer-readable medium of claim 13, wherein the modeling comprises using the volumetric representation comprising one or more masking fields that operate on other coverage values of one or more other fields to affect compositing behavior of the other coverage values.

20. The non-transitory computer-readable medium of claim 13, wherein any operation between two of the fields of the volumetric representation generates a new field that absorbs the two fields so all relations are maintained and are editable at any point therein.

21. The non-transitory computer-readable medium of claim 13, wherein the fields of the volumetric representation are contained in channels comprising a boundary channel that specifies an absolute boundary of one or more defined properties, a meso-structure channel that produces the porosity within the three dimensional space, and a material mixing channel that produces the material mixing within the three dimensional space.

22. The non-transitory computer-readable medium of claim 21, wherein the operations comprise:
presenting on a display device a user interface showing functional composition graphs indicating evaluation and composition of the fields in the channels of the volumetric representation of the three dimensional object as specified by at least the at least one of the fields;
receiving user input through the functional composition graphs of the user interface; and
modifying the evaluation and composition of the fields in the channels of the volumetric representation of the three dimensional object in accordance with the user input.

23. The non-transitory computer-readable medium of claim 22, wherein the operations comprise:
using the evaluation and composition of the fields to evaluate a cell of the three dimensional object at different density levels in accordance with composition using the meso-structure channel and the material mixing channel, thereby generating a homogenized representative volume element;

initiating finite element numerical simulation of the three dimensional object using the homogenized representative volume element and output generated with the boundary channel; and modifying the evaluation and composition of the fields, one or more fields in the meso-structure channel or the material mixing channel or both, or both the evaluation and composition of the fields and the one or more fields responsive to results of the finite element numerical simulation of the three dimensional object.

24. The non-transitory computer-readable medium of claim 23, wherein the modifying responsive to the results of the finite element numerical simulation comprises producing a conformal lattice within the three dimensional object that follows principal stress directions indicated by the results of the finite element numerical simulation.

25. A system comprising:
a non-transitory storage medium having instructions of a computer aided design program stored thereon; and
one or more data processing apparatus able to run the instructions of the computer aided design program to perform operations that store a representation of a three dimensional (3D) model, and enable user manipulation of the 3D model, the instructions of the computer aided design program being configured to cause the one or more data processing apparatus to
model a three dimensional object using a volumetric representation of volumetric properties including material mixing and porosity within a three dimensional space of the three dimensional object, the volumetric representation comprising fields that determine the volumetric properties, each of the fields being parameterized by an input and output tensor structure, and at least one of the fields mapping tensor output of a first of the fields to tensor input of a second of the fields to provide a unified framework for geometry manipulation and composition that encompasses both discrete and continuous representations of materials in the three dimensional space of the three dimensional object,
evaluate the fields of the volumetric representation, including the at least one of the fields using coverage values that determine compositing behavior when mapping the tensor output of the first of the fields to the tensor input of the second of the fields, to generate output data corresponding to the volumetric properties, and
provide the output data for the three dimensional object, wherein the three dimensional object has physical characteristics that vary from point to point within a volume of the three dimensional object in accordance with the volumetric properties;
wherein the volumetric representation comprises one or more composite fields that reference other fields, creating an associative hierarchy of tensor to tensor maps, and the associative hierarchy of tensor to tensor maps includes a definition of a microstructure that is modulated, via the associative hierarchy, through the three dimensional space of the three dimensional object to produce at least a portion of the physical characteristics that vary from point to point within the volume of the three dimensional object.

26. The system of claim 25, wherein the fields of the volumetric representation do not have an intrinsic resolution, and the volumetric representation comprises one or more fields of primitive building block field types comprising signed distance fields around geometric entities, dense grid-based fields, and fields that extend local coordinate systems to produce conformal lattices.

27. The system of claim 25, comprising one or more computer-controlled manufacturing systems comprising an additive manufacturing machine or a subtractive manufacturing machine, wherein the one or more data processing apparatus are able to run the instructions of the computer aided design program to generate toolpath specifications for the additive manufacturing machine or the subtractive manufacturing machine from at least a portion of the 3D model, and to manufacture at least a portion of a physical structure corresponding to the at least a portion of the 3D model with the additive manufacturing machine or the subtractive manufacturing machine using the toolpath specifications generated for the additive manufacturing machine or the subtractive manufacturing machine.

28. The system of claim 25, wherein the fields of the volumetric representation do not have an intrinsic resolution, the instructions are configured to cause the one or more data processing apparatus to evaluate the fields of the volumetric representation by being configured to cause the one or more data processing apparatus to generate the output data sparsely, and the instructions are configured to cause the one or more data processing apparatus to provide the output data for the three dimensional object by being configured to cause the one or more data processing apparatus to visualize the output data on a display device.

29. The system of claim 25, wherein the fields of the volumetric representation do not have an intrinsic resolution, the instructions are configured to cause the one or more data processing apparatus to evaluate the fields of the volumetric representation by being configured to cause the one or more data processing apparatus to generate the output data at a resolution specified for three dimensional printing, and the instructions are configured to cause the one or more data processing apparatus to provide the output data for the three dimensional object by being configured to cause the one or more data processing apparatus to send the output data to a machine to perform the three dimensional printing.

30. The system of claim 26, wherein the instructions are configured to cause the one or more data processing apparatus to model the three dimensional object by being configured to cause the one or more data processing apparatus to use the volumetric representation comprising one or more composite fields that reference other fields, creating an associative hierarchy of tensor to tensor maps.

31. The system of claim 25, wherein modulation of the microstructure through the three dimensional space of the three dimensional object produces a lattice for the three dimensional object.

32. The system of claim 25, wherein the instructions are configured to cause the one or more data processing apparatus to model the three dimensional object by being configured to cause the one or more data processing apparatus to use the volumetric representation comprising one or more masking fields that operate on other coverage values of one or more other fields to affect compositing behavior of the other coverage values.

33. The system of claim 25, wherein any operation between two of the fields of the volumetric representation generates a new field that absorbs the two fields so all relations are maintained and are editable at any point therein.

34. The system of claim 25, wherein the fields of the volumetric representation are contained in channels comprising a boundary channel that specifies an absolute boundary of one or more defined properties, a meso-structure channel that produces the porosity within the three dimensional space, and a material mixing channel that produces the material mixing within the three dimensional space.

35. The system of claim 34, wherein the instructions of the computer aided design program are configured to cause the one or more data processing apparatus to:
present on a display device a user interface showing functional composition graphs indicating evaluation and composition of the fields in the channels of the volumetric representation of the three dimensional object as specified by at least the at least one of the fields;
receive user input through the functional composition graphs of the user interface; and
modify the evaluation and composition of the fields in the channels of the volumetric representation of the three dimensional object in accordance with the user input.

36. The system of claim 34, wherein the instructions of the computer aided design program are configured to cause the one or more data processing apparatus to:
use the evaluation and composition of the fields to evaluate a cell of the three dimensional object at different density levels in accordance with composition using the meso-structure channel and the material mixing channel, thereby generating a homogenized representative volume element;
initiate finite element numerical simulation of the three dimensional object using the homogenized representative volume element and output generated with the boundary channel; and
modify the evaluation and composition of the fields, one or more fields in the meso-structure channel or the material mixing channel or both, or both the evaluation and composition of the fields and the one or more fields responsive to results of the finite element numerical simulation of the three dimensional object.

37. The system of claim 36, wherein the instructions are configured to cause the one or more data processing apparatus to modify responsive to the results of the finite element numerical simulation by being configured to cause the one or more data processing apparatus to produce a conformal lattice within the three dimensional object that follows principal stress directions indicated by the results of the finite element numerical simulation.

* * * * *

UNITED STATES PATENT AND TRADEMARK OFFICE
CERTIFICATE OF CORRECTION

| | | |
|---|---|---|
| PATENT NO. | : 12,365,031 B2 | Page 1 of 1 |
| APPLICATION NO. | : 17/742309 | |
| DATED | : July 22, 2025 | |
| INVENTOR(S) | : Tourangeau et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this
Sixteenth Day of December, 2025

John A. Squires
*Director of the United States Patent and Trademark Office*